(12) United States Patent
Machiyama et al.

(10) Patent No.: US 7,689,346 B2
(45) Date of Patent: Mar. 30, 2010

(54) FUEL INJECTION DEVICE OF DIESEL ENGINE

(75) Inventors: Hiroyuki Machiyama, Osaka (JP); Nobuyoshi Fukae, Osaka (JP); Shigeki Tada, Osaka (JP); Hideo Shiomi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 208 days.

(21) Appl. No.: 11/815,676

(22) PCT Filed: Jan. 19, 2006

(86) PCT No.: PCT/JP2006/300732
§ 371 (c)(1),
(2), (4) Date: Sep. 27, 2007

(87) PCT Pub. No.: WO2006/082710
PCT Pub. Date: Aug. 10, 2006

(65) Prior Publication Data
US 2009/0012701 A1    Jan. 8, 2009

(30) Foreign Application Priority Data
Feb. 7, 2005 (JP) ............................. 2005-030873
Feb. 7, 2005 (JP) ............................. 2005-030874

(51) Int. Cl.
*G06F 19/00* (2006.01)
*F02D 41/06* (2006.01)

(52) U.S. Cl. .................... 701/113; 123/179.17; 123/491

(58) Field of Classification Search ............ 123/179.16, 123/179.17, 357, 478, 480, 491; 701/101–105, 701/110, 113
See application file for complete search history.

(56) References Cited

U.S. PATENT DOCUMENTS 4,223,654 A    9/1980    Wolf et al.

(Continued)

FOREIGN PATENT DOCUMENTS

EP    0 566 281    10/1993

(Continued)

OTHER PUBLICATIONS

Supplementary European Search Report and European Search Opinion for European Application No. EP06711978 dated Nov. 19, 2008, 6 pgs.

*Primary Examiner*—Willis R Wolfe, Jr.
(74) *Attorney, Agent, or Firm*—Sterne, Kessler, Goldstein & Fox P.L.L.C.

(57) ABSTRACT

A fuel injection device of a diesel engine capable of smoothly starting the diesel engine to match an environment around the engine by saving fuel, reducing the exhaustion of carbon dioxide, and suppressing black smoke in starting the diesel engine. A rack is operated by an actuator from a lowest rack position to a starting increased fuel amount position at a lower speed than that at which the rack is operated by the actuator from the lowest rack position to the starting increased fuel amount position at the maximum operating speed. The operating speed of the rack is set in two stages, and the later operating speed of the rack is reduced less than the operating speed of the rack up to a set intermediate rack target value P2. Then, the operating amount of the rack per hour is reduced after the ignition of the engine is recognized. Also, the operating speed of the rack is controlled according to an atmospheric temperature in starting the engine.

8 Claims, 24 Drawing Sheets

U.S. PATENT DOCUMENTS

| | | | |
|---|---|---|---|
| 4,502,437 A | 3/1985 | Voss | |
| 4,583,506 A | 4/1986 | Okamoto | |
| 4,656,980 A * | 4/1987 | Ohkoshi | 123/179.16 |
| 5,613,474 A * | 3/1997 | Nakamura et al. | 123/179.17 |
| 6,990,946 B2 * | 1/2006 | Goto | 123/275 |
| 7,051,706 B2 * | 5/2006 | Tanaka et al. | 123/179.17 |

FOREIGN PATENT DOCUMENTS

| | | | | |
|---|---|---|---|---|
| EP | 1 617 054 | | 1/2006 | |
| JP | 07054692 A | * | 2/1995 | 123/179.17 |
| JP | 9060533 A | * | 3/1997 | 123/357 |
| JP | 2000-199448 | | 7/2000 | |
| JP | 2004-316488 | | 11/2004 | |

* cited by examiner (a)

(b)

(a)

(b)

(a)

(b)

(a)

(b)

(a)

(b)

(a)

(b)

(c)

(a)

(b)

(a)

(b)

(a)

(b)

(a)

(b)

FUEL INJECTION DEVICE OF DIESEL ENGINE

BACKGROUND OF THE INVENTION

1. Field of the Invention

This invention relates to a fuel injection device of a diesel engine and more particularly to a control system of a rack position by a governor.

2. Background Art

In starting the diesel engine, the amount of fuel injection is typically increased for the start ability by making a starting fuel amount position of the rack in the fuel injection pump shifted to an increased starting fuel amount position. Providing enough amount of fuel to the engine keeps the start ability without considering the environment of the engine.

FIG. 24 typically illustrates a conventional starting process of the engine. It is operated in the order, (a), (b), and (c) in FIG. 24. The left part of FIG. 24 illustrates a situation of the fuel injection pump. The center part of FIG. 24 illustrates a situation of a starter motor 32. The right part of FIG. 24 illustrates a relation between the rack position and the elapsed time.

As shown in FIG. 24, an electronic governor 41 controls the amount of fuel injection of the fuel injection pump 34; in this case, the amount is zero until the engine starts. When the starting switch is turned on, the rack is operated to a starting increased fuel amount position and the starter motor cranks up the engine. The electronic governor operates the rack to the position before the starter motor finishes cranking, and enough amount of fuel corresponding to the starting increased fuel amount position is supplied to cylinders of the engine 1.

Japanese patent application H5-321699 discloses, for example, that the electronic governor adjusts the amount of fuel injection according to the temperature of the engine oil.

However, the larger amount of fuel than the is sufficient is supplied to the engine when the starter motor cranks up the engine. Therefore, the fuel consumption becomes higher in starting the engine, and surplus fuel may cause black smoke.

In the art, enough amount of fuel for starting the engine is supplied at the beginning and the fuel supply tends to become higher, so that the fuel consumption for starting the engine becomes higher.

DISCLOSURE OF INVENTION

Problems to be Solved by the Invention

The objective of the invention is to propose a fuel injection device of a diesel engine capable of smoothly starting the engine to match an environment around the engine, of saving fuel, and of suppressing black smoke in starting the engine.

Means of Solving the Problems

According to the invention, this objective is achieved by the device as follows.

A first feature of the invention is that a fuel injection device of a diesel engine comprises a means for increasing fuel amount in starting the engine, said means for increasing fuel amount comprises a rack operated within an operating speed range in a starting increased fuel amount position from the lowest rack position, said operating speed range is slower than the maximum rack operating speed.

A second feature of the invention is that the rack is operated at two step speeds, a first speed to a configured rack position and a second speed slower than first, during the operation of the rack from the lowest rack position to a starting increased fuel amount position.

A third feature of the invention is that target positions of the rack at the elapsed time are configured as a plurality of stages during the operation of the rack from the lowest rack position to a starting increased fuel amount position.

A fourth feature of the invention is that a fuel injection device of a diesel engine comprises a means for increasing fuel amount and a means for recognizing the ignition of the engine in starting the engine, wherein said means for increasing fuel amount comprises a rack operated from the lowest rack position to a starting increased fuel amount position and operated for reducing displacement of the rack per time after the ignition of the engine is recognized.

A fifth feature of the invention is that the rack is operated to the starting increased fuel amount position at the maximum operating speed after a predetermined time.

A sixth feature of the invention is that the operating speed of the rack is changed according to a temperature in starting the engine.

A seventh feature of the invention is that the set intermediate rack target position is changed according to a temperature in starting the engine.

In the case that the fuel injection device comprises an electronic actuator, the invention is embodied as follows.

A fuel injection device of a diesel engine comprising a rack operated by the actuator and a means for increasing fuel amount in starting the engine, wherein the rack is operated from the lowest rack position to a starting increased fuel amount position at a lower speed than that at which the rack is operated from the lowest rack position to the starting increased fuel amount position at the maximum operating speed. As a result, it is possible to ignite the engine at a necessary rack position for starting the engine at the state of low or high temperature.

A fuel injection device of a diesel engine comprising a rack operated by the actuator and a means for increasing fuel amount in starting the engine, wherein the rack is operated from the lowest rack position to a starting increased fuel amount position at the operating speed of the rack set in two steps, and the later operating speed of the rack is reduced less than the operating speed up to a set intermediate rack target value. As a result, it is possible to shorten the time to ignite, and it is possible to suppress black smoke in starting the engine.

A fuel injection device of a diesel engine comprising a rack operated by the actuator and a means for increasing fuel amount in starting the engine, wherein the rack is operated according to rack target positions that are set in numerous steps according to elapsed time and the rack target value is selected. As a result, it is possible to surely suppress black smoke and to save fuel in starting the engine.

A fuel injection device of a diesel engine comprising a rack operated by the actuator and a means for increasing fuel amount in starting the engine, wherein the rack is operated from the lowest rack position to a starting increased fuel amount position, the operating speed of the rack is reduced after the ignition of the engine is recognized. As a result, it is possible to avoid surplus fuel supply to the engine after the ignition and to suppress black smoke in starting the engine.

The rack is operated to the starting increased fuel amount position at the maximum operating speed after a predetermined time passes. As a result, it is possible to smoothly start the engine even if the engine drives a work machine or the work machine gives many loads to the engine.

The set intermediate rack target value is set according to a temperature in starting the engine. As a result, it is possible to start the engine according to the condition of fuel, to save fuel, to suppress black smoke, and to shorten the time required to start.

The operating speed of the rack is controlled according to a temperature in starting the engine. As a result, it is possible to start the engine according to the condition of fuel and to shorten the time required to start.

Moreover, the fuel injection device comprising a mechanical governor is concretely configured as follows.

A fuel injection device of a diesel engine comprising a means for increasing fuel amount in starting the engine by means of the operation of the rack by a governor lever which is connected to the mechanical governor and operates the rack, wherein a resistance body is contacted to the governor lever in starting the engine, and the operating speed of the governor lever 7 to the starting increased fuel amount position is reduced. As a result, it is possible to ignite the engine at a necessary rack position for starting the engine from the state of low temperature to the state of high temperature.

The resistance body is contacted to the governor lever on the way to the starting increased fuel amount position. As a result, the operating speed is controllable on the way, and it is possible to suppress black smoke and to shorten the time required to start.

A damper device that comprises a casing installing a governor is contacted to the governor lever. As a result, it is possible to control the contacting position from the outside of the casing of the governor and to easily adjust.

The resistance body installs a temperature-sensitive element, so that the position where the resistance body is contacted to the governor lever is capable of being adjusted according to the temperature in starting the engine. As a result, it is possible to control the amount of fuel injection according to the temperature condition, and it is possible to suppress black smoke, and to shorten the time required to start.

In a fuel injection device of a diesel engine comprising a (CSD) and a means for increasing fuel amount in starting the engine by means of the operation of the rack, the position where the speed of the rack is changed is adjusted according to the condition of the CSD. As a result, it is possible to improve the engine start and suppress black smoke even in the fuel injection pump comprising the CSD.

In a fuel injection device of a diesel engine comprising a CSD and a means for increasing fuel amount in starting the engine by means of the operation of the rack, the operating speed of the rack is adjusted according to the condition of the CSD. As a result, it is possible to improve the engine start and suppress black smoke even in the fuel injection pump comprising the CSD.

EFFECT OF THE INVENTION

The fuel injection device of a diesel engine of the invention provides a diesel engine starting smoothly, matching an environment around the engine, saving fuel and suppressing black smoke in starting the engine.

An advantage is that the amount of hydrocarbon exhaust when the engine starts is reduced and black smoke is suppressed in starting the engine. A further advantage is that the amount of fuel required to start is reduced and that the response to the starting operation when the engine starts is improved. A still further advantage is that a smooth start is secured corresponding to the environment around the engine and that black smoke is suppressed.

DETAILED DESCRIPTION OF THE INVENTION

The Best Mode for Carrying Out the Invention

The invention is to improve the engine start by adjusting the operating speed of the rack in starting the engine.

First Embodiment

Figure 1:
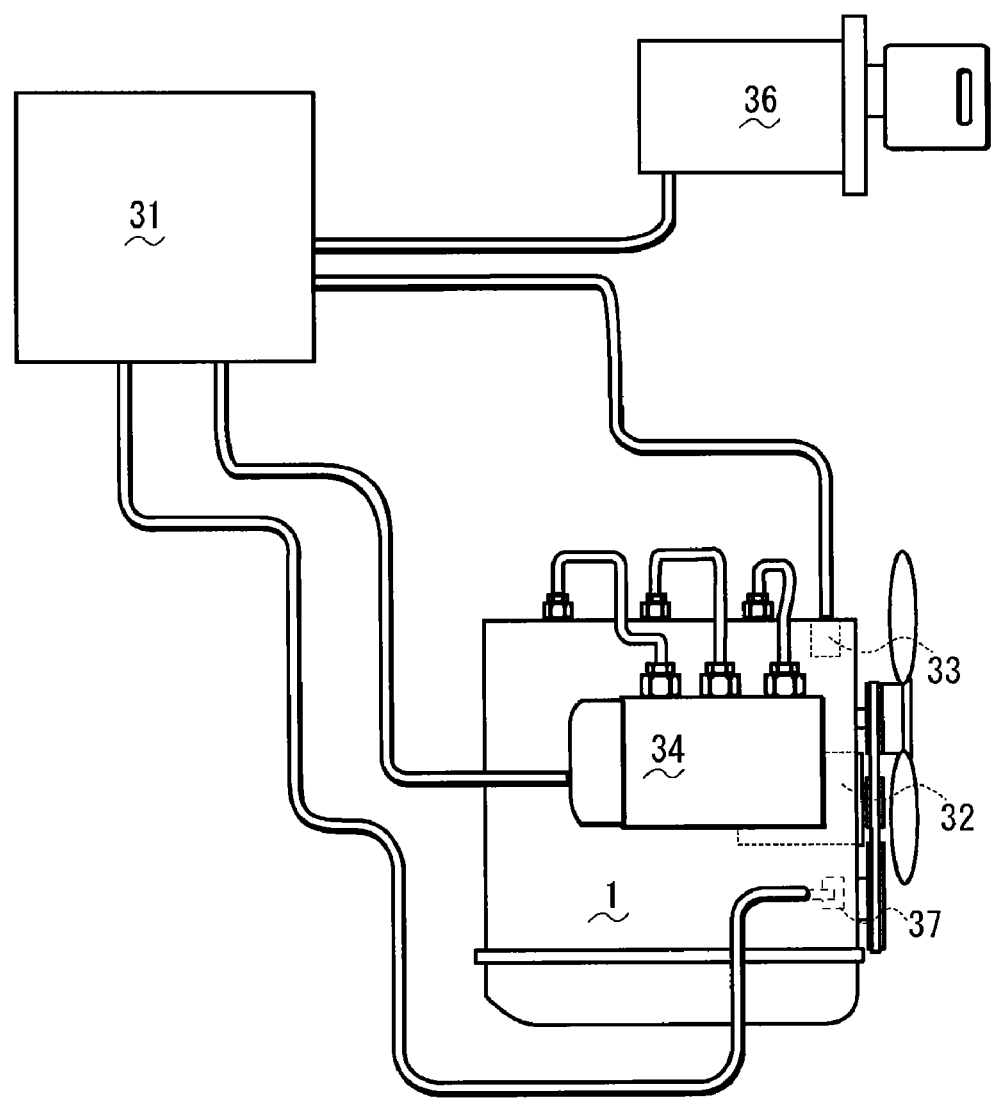
FIG. 1 is a sectional side view of the fuel injection device.

The preferred embodiment of the invention is as shown in the presentation below, making reference to the drawings. FIG. 1 illustrates a sectional side view of the fuel injection device according to the invention.

In an especially preferred embodiment of the invention, the device is configured as an engine 1, a starter motor 32 which helps to start the engine, a controller 31, a start switch 36, a fuel injection pump 34, and a pick up sensor 37 which recognizes the engine condition.

The engine 1 comprises the starter motor 32, the fuel injection pump 34, the pick up sensor 37, and a thermo sensor 33. The starter motor 32 drives a crankshaft of the engine in starting the engine. The fuel injection pump 34 is controlled by the controller 31, which measures the speed of revolution of the engine 1 and controls the fuel injection pump 34 on the basis of a map stored in the controller 31 and relating the revolution of the engine to the amount of fuel injection.

The fuel injection pump 34 compresses and supplies fuel synchronizing with the revolution of the crankshaft, and is controlled by the electronic governor (comprised in the fuel injection pump 34). The pick up sensor 37 measures the speed of revolution of the crankshaft, and recognizes the situation of cranking or of driving. The thermo sensor 33 measures the temperature of the cooling water of the engine 1.

The controller 31 is connected to the start switch 36, the fuel injection pump 34, the pick up sensor 37, and the thermo sensor 33. The controller 31 can recognize whether the start switch 36 is turned on or off, and can detect the speed of revolution of the crankshaft. And the controller 31 can control the fuel injection pump 34. The start switch 36 is for driving the engine 1 or for stopping the engine 1, and the start switch 36 has three positions, "ON (driving)", "OFF (stopped)", "START (cranking)." The start switch 36 is set to the 'START' position, and the starter motor 32 is driven and the cranking (starting the engine) is begun. The start switch 36 is returned automatically from 'START' position to 'ON' position, so that the start switch 36 remains at 'ON' position after the engine is started and the engine 1 is kept driving. The thermo sensor 33 allows the controller 31 to recognize the temperature of the cooling water of the engine 1. The controller 31 detects the period that the start switch 36 is kept at 'START' position. And the starter motor 32 is driven during that period.

Figure 2:
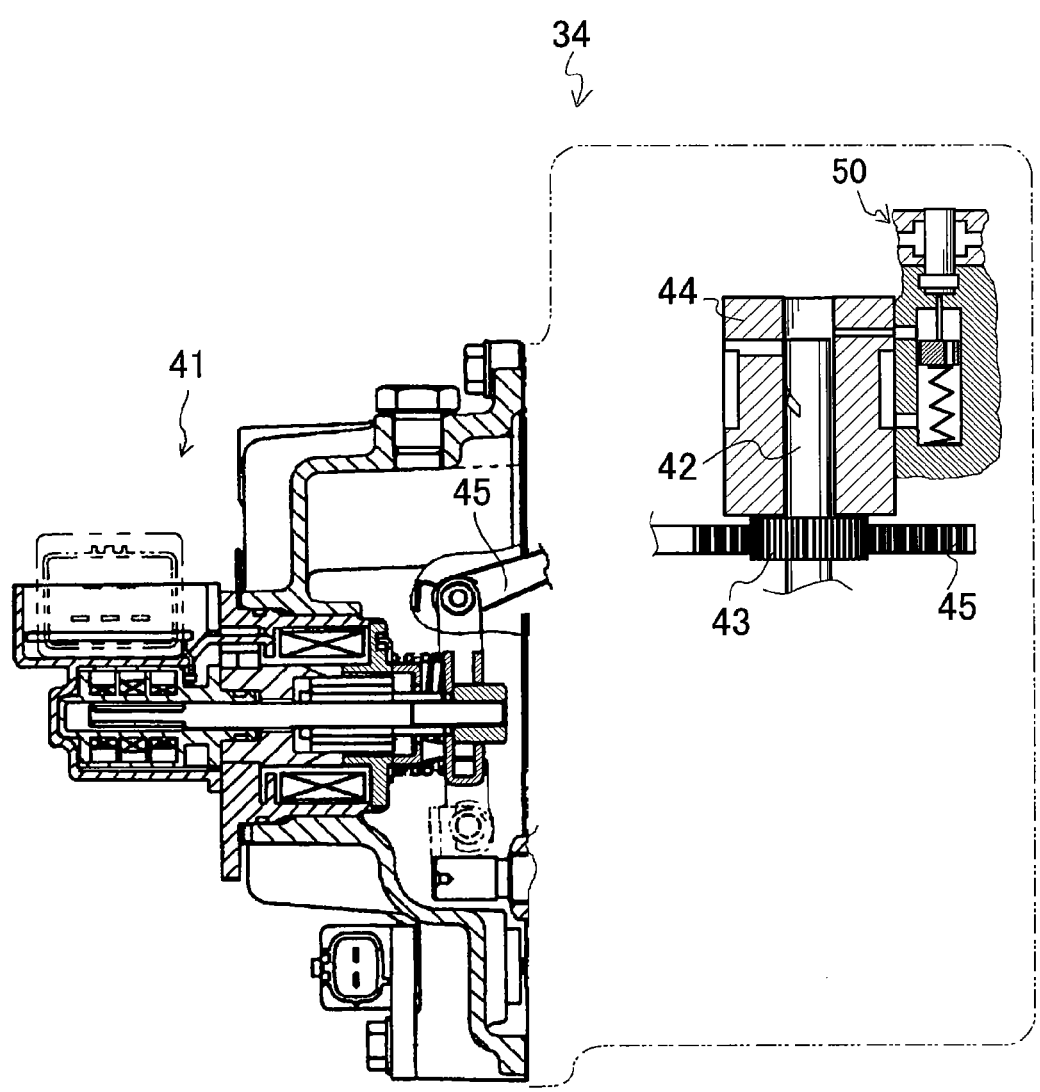
FIG. 2 is a partly sectional side view of fuel injection device.

The fuel injection pump is described below. FIG. 2 illustrates partly sectional side view of fuel injection device.

The fuel injection pump 34 compresses and supplies fuel synchronizing with the revolution of the crankshaft of the engine 1. The electronic governor 41 electronically controls the amount of fuel injection that is compressed and supplied. The fuel injection pump 34 comprises the electronic governor 41, a plunger 42, a sleeve 44, a pinion 43, and a rack 45. The plunger 42 slides up and down in the sleeve 44 synchronizing with the revolution of the crankshaft. The sleeve 44 is fixed in the casing of the fuel injection pump 34, and is comprised with a port as an outlet of fuel.

The plunger 42 comprises a spiral groove. The relation between a position of the groove and a position of a port in the sleeve 44 makes the amount of fuel injection adjusted. The amount of fuel injection is adjusted according to the position of revolution of the plunger 42 in the sleeve 44. The electronic governor 41 controls the position of revolution of the plunger 42.

The pinion 43 is attached and fixed to the plunger 42, and is meshed with the rack 45. The electronic governor 41 controls the rack 45 to be slid. The electronic governor 41 slides the rack 45 and changes the position of the rack 45, and the pinion 43 is revolved. Thus, the position of the revolution of the plunger 42 in the sleeve 44 is controlled, and the amount of fuel injection is controlled. The electronic governor 41 is comprised with a linear solenoid or electronic cylinder and is controlled by the controller 31. In this embodiment of the invention, an arm connected to the rack 45 is connected to the one-side of the solenoid, so that the arm operates the rack 45. The electronic governor 41 operates the rack 45 according to the speed of the revolution of the engine by means of the controller 31, and properly controls the amount of fuel injection.

A cold start device (hereinafter "CSD") 50 is comprised at the side of the sleeve 44. The CSD 50 changes the amount of fuel injection and the timing of fuel injection according to the combustion temperature.

The CSD attached to the fuel injection pump is described below.

Figure 3:
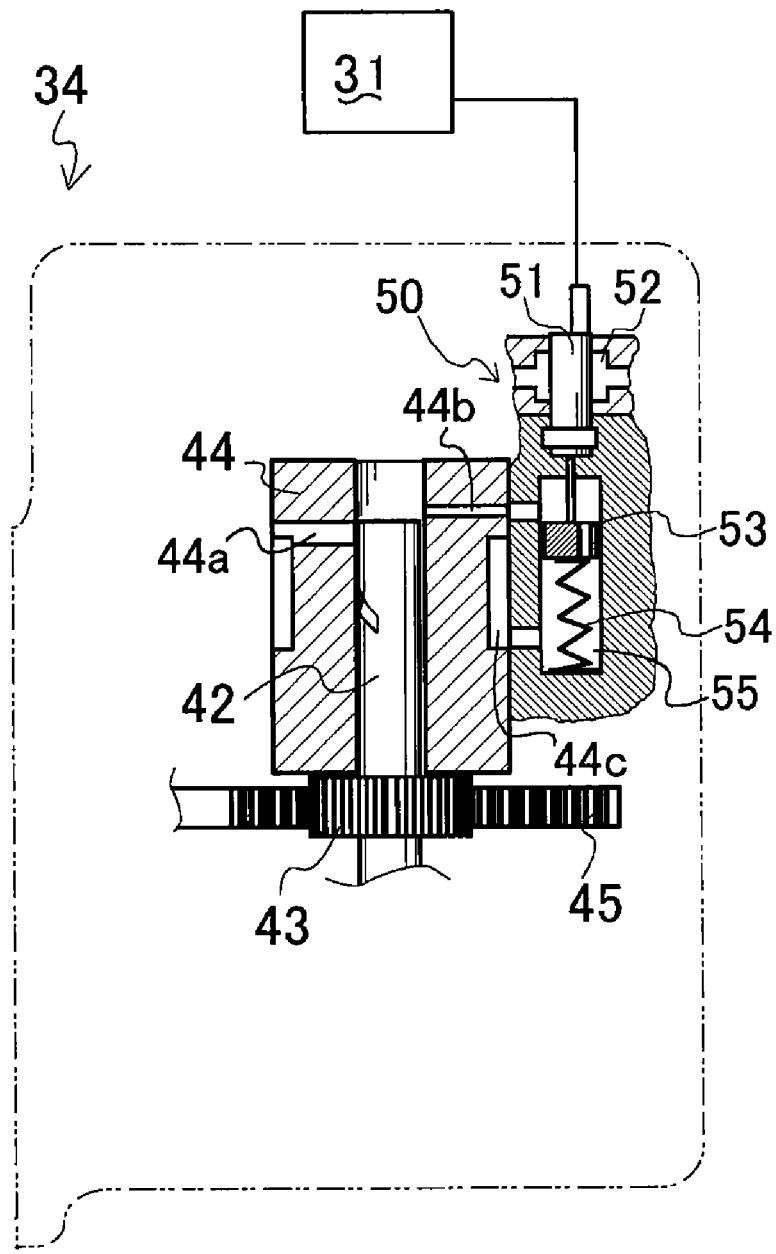
FIG. 3 is a partly sectional side view of a CSD.

FIG. 3 illustrates partly sectional side view of the CSD.

The CSD 50 changes the amount of fuel injection and the timing of fuel injection according to the combustion temperature by means of opening or shutting an oil passage between a sub port 44b and a combustion gallery 44c. The CSD 50 is comprised with a cylinder 51, a combustion chamber 52, a piston 53, a spring 54, and a piston chamber 55. The volume of the wax in the cylinder 51 changes according to the combustion temperature, so that the piston 53 is slid, and the oil passage between the sub port 44b and the combustion gallery 44c is opened or shut. The cylinder 51 is comprised in the combustion chamber 52 into which fuel flows.

The fuel is introduced into the sleeve 44 via the combustion chamber 52. The cylinder 51 includes the wax that melts at a certain temperature. The piston 53 is attached to the tip of the rod of the cylinder 51. The piston 53 is comprised in the piston chamber 55. The piston 53 comprises a longitudinal hole, so that the upper space of the piston 53 can communicate with the lower space of the piston 53. The piston 53 is slid according to the change of the volume of the wax and the oil passage between the sub port 44b and the combustion gallery 44c is opened or shut. The lower portion of the piston 53 is contacted to the spring 54, which biases the piston 53 upward.

In the CSD 50, when the combustion temperature is low, the wax freezes and the piston 53 is slid upward, and the oil passage between the sub port 44b and the combustion chamber 44c becomes shut. This is an ON condition of the CSD 50. As a result, the amount of fuel injection is increased and the timing of fuel injection is advanced. It is possible to change it for an electromagnetic valve to operate the CSD_50. In the controller 31, the indication, whether the CSD 50 is "ON" or "OFF" is recognized as the condition of the CSD 50.

The control system of the electronic governor 41 by means of the controller 31 is described below.

The controller 31 controls the position of the rack 45 in cranking the engine, so that smooth ignition of the engine is achieved and the black smoke is reduced in starting the engine. The start switch 36 is set in "OFF" position, and the rack 45 is operated toward the reduced fuel amount position until the zero fuel amount position after the conduction to the electronic governor 41 is released. The rack 45 is operated to the starting fuel amount position in starting the engine, so that the smooth start is achieved.

Figure 4:
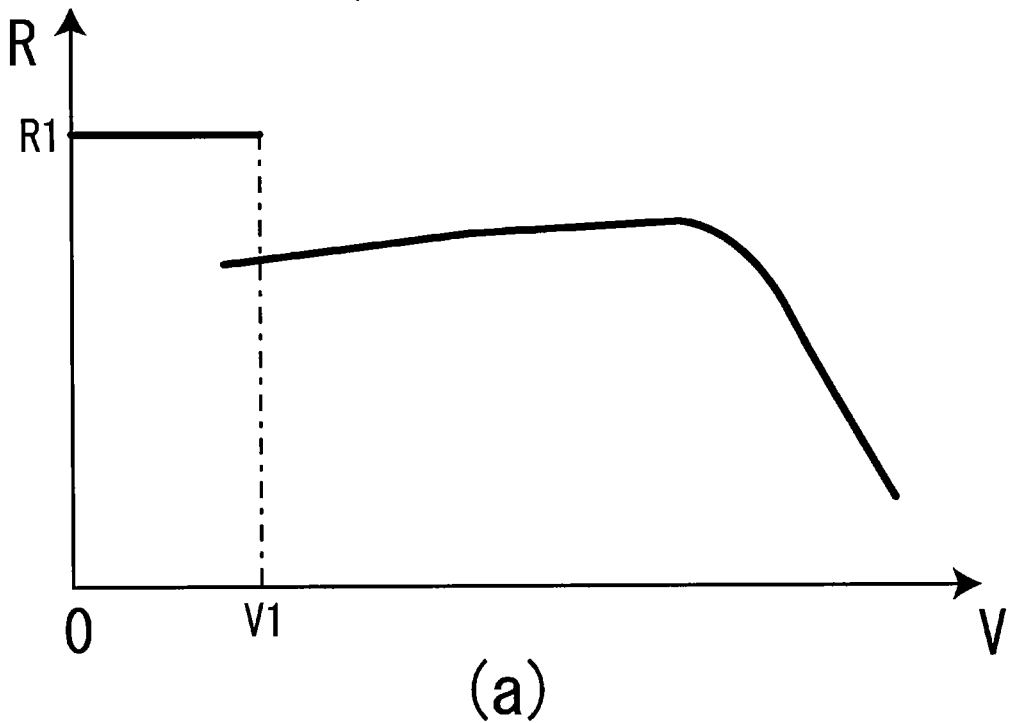
FIG. 4 is a view illustrating an operation of the rack.
Figure 4:
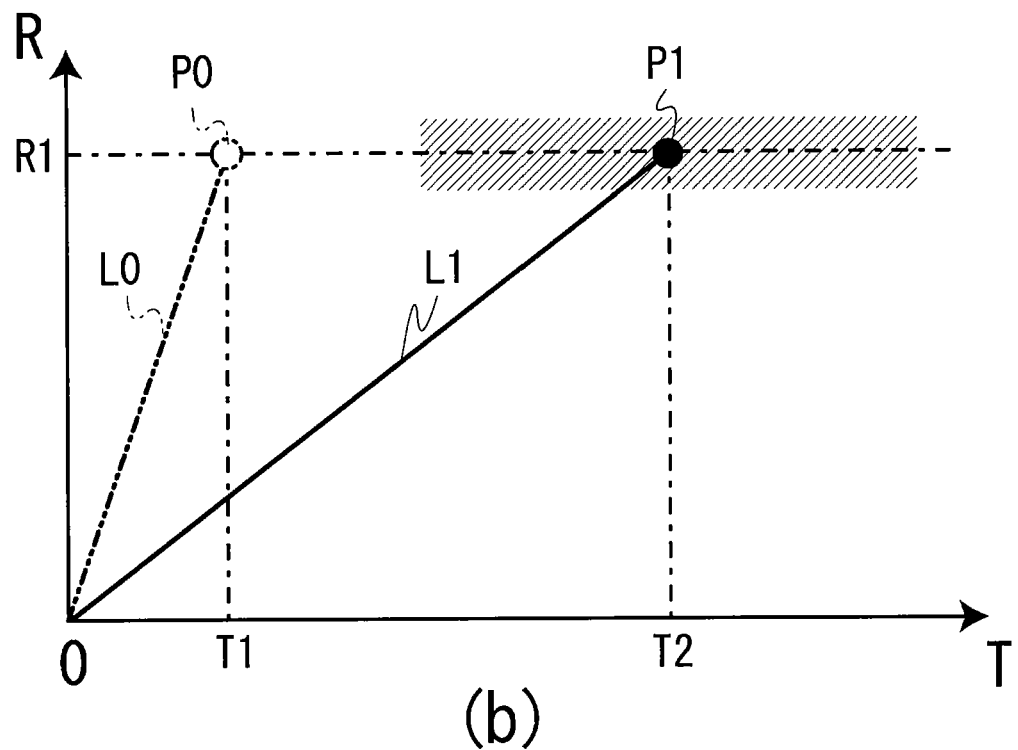
Figure 5:
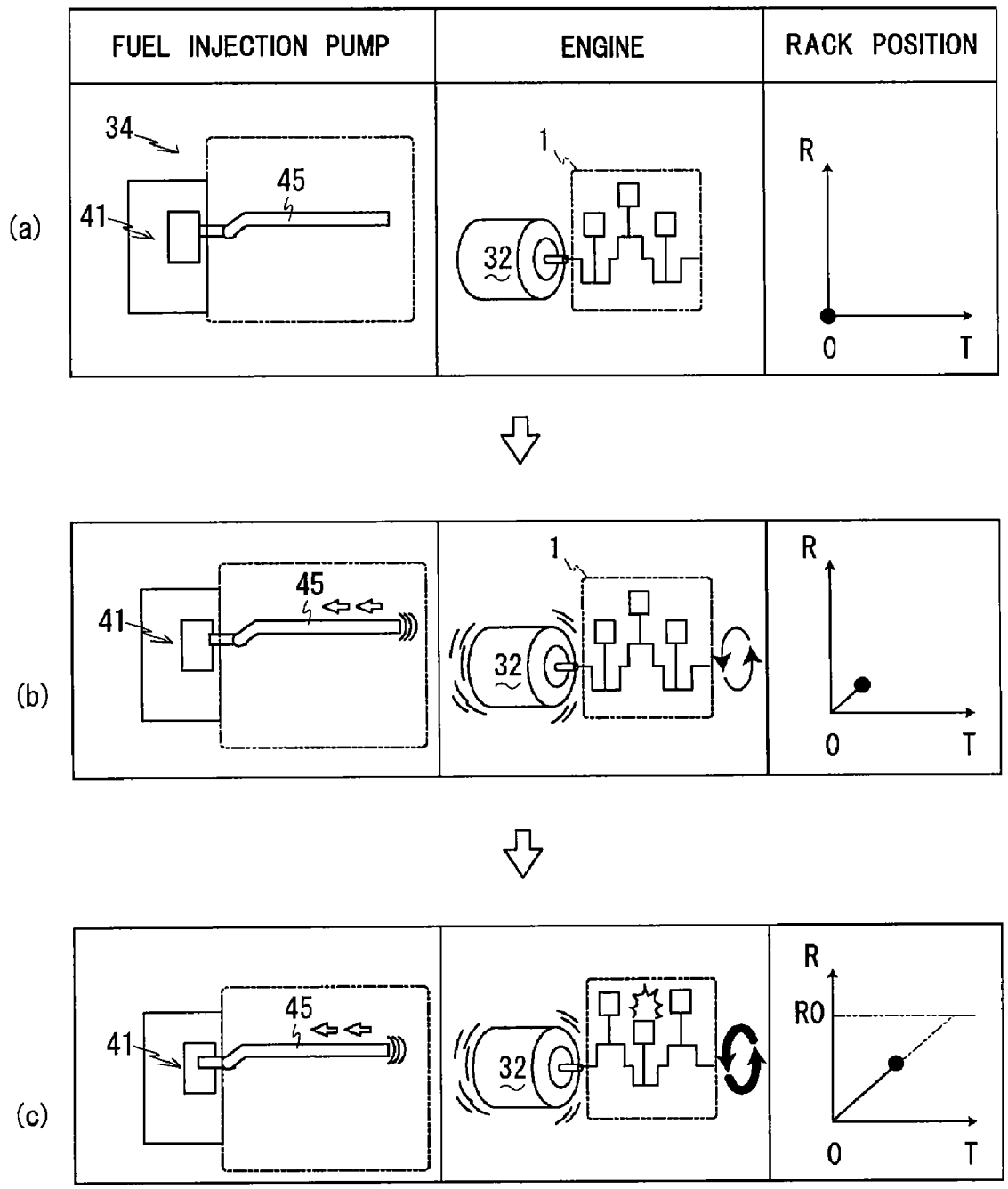
FIG. 5 is a schematic illustration illustrating an operation of the electronic governor and starter motor.

FIG. 4 illustrates the operation of the rack. FIG. 4(a) illustrates the relation between the position of the rack and the speed of revolution of the engine. FIG. 4(b) illustrates the relation between the position of the rack and the elapsed time from starting. FIG. 5 is a schematic illustration illustrating operation of the electronic governor and the starter motor in starting the engine.

In the FIG. 4(a), an axis of ordinate is the position of the rack; the upper side shows an increased fuel amount position. An axis of abscissa is the speed of revolution of the engine. A position R1 of the rack is a starting fuel amount position of the rack 45. The target value of the rack 45 is set in the position R1 in starting the engine (when the start switch 36 is set in "START" position). In driving the engine 1, R (the position of the rack 45) is controlled according to V (the speed of revolution of the engine).

In the FIG. 4(*b*), an axis of ordinate is the ordered position of the rack, and an axis of abscissa is the elapsed time from starting. The two-dot chain line L0 is the line showing the conventional operation of the rack. And the line L1 is the line showing the operation of the rack in this embodiment. The hatched area is the area showing the tolerance of the time that the rack reaches the starting fuel amount position. The operating speed of the rack 45 as shown in L0 or L1 has no relation to the speed of revolution of the engine. The electronic governor 41 controls the position of the rack 45 to be the position ordered by the controller 31. The actual position of the rack 45 at a certain time is different from the ordered position of the rack in terms of time and position.

The controller 31 orders the electronic governor 41 to control the rack 45 and operate the position of the rack 45 to the starting fuel amount position R1. The operating speed of the rack 45 is slower than the conventional and the arrival time is controlled as T1<T2. In the FIG. 4, the electronic governor 41 controls the rack 45 to be operated to the target position at a constant speed.

T1 is simply the period that the rack 45 reaches the target position by the electronic governor 41 when the position R1 is ordered as the target position, and T1 depends on the performance of the electronic governor 41. T1 is usually about 0.1 seconds. As shown in the hatched area in FIG. 4, T2 is as three times to eight times as T1. As a result, the amount of fuel injection is gradually increased, so that the excessive supply can be avoided and black smoke can be suppressed.

If it is desired to save fuel in starting the engine, the operating speed is constantly set and T2 is set long. If it is desired to shorten the starting time, the operating speed is constantly set and T2 is set short. If it is desired to save fuel in starting the engine and keep the conventional starting time, T2 is set in 0.5-0.75 seconds. In this embodiment, we can achieve good engine start as T2 is set at 0.7 seconds.

That is, the operating speed from the lowest position to the increased fuel amount position is set slower than the operating speed achieved by the highest operating speed of the actuator.

In this embodiment, as shown in FIG. 5, when the start switch 36 is set in "START" position, the rack 45 is operated from an initial situation (as shown in FIG. 5(*a*)) to the starting fuel amount position, and the starter motor 32 begins to crank. In FIG. 5, a graph in right side shows the relation between the position of the rack R and the elapsed time T. In this embodiment, the operating speed of the rack 45 is slower than the conventional one. Because of the cranking by the starter motor 32, as shown in FIGS. 5(*b*) and (*c*), some fuel injections are done before the rack 45 reaches the starting increased fuel amount position, so that the amount of fuel injection can be gradually increased according to every timing by the cranking that injects fuel, thus there is a little error from the optimum amount of fuel injection for the ignition of the engine 1.

As a result, saving fuel is achieved compared with the case that the rack 45 is operated to the position R0 to supply enough for the engine start from the start.

A method to operate the rack 45 gradually to the starting increased fuel position is to change the target value of the rack according to time, or to control the inputs for the electronic governor 41 by means of a PI gain.

In the method to change the target value of the rack according to time, the integration of time is started when the start switch 36 is set in the "START" position. In the controller 31, the target value of the rack 45 according to the integrated time is memorized, and the electronic governor 41 operates the rack 45 to the position of the target value. Thus, the rack 45 is gradually operated to the fuel increased side in starting the engine.

In the controller 31, the target value of the rack 45 according to the integrated time is memorized in advance, so that the controller 31 can operate the rack 45 to the starting fuel position by means of the electronic governor 41 more slowly than the conventional.

Figure 6:
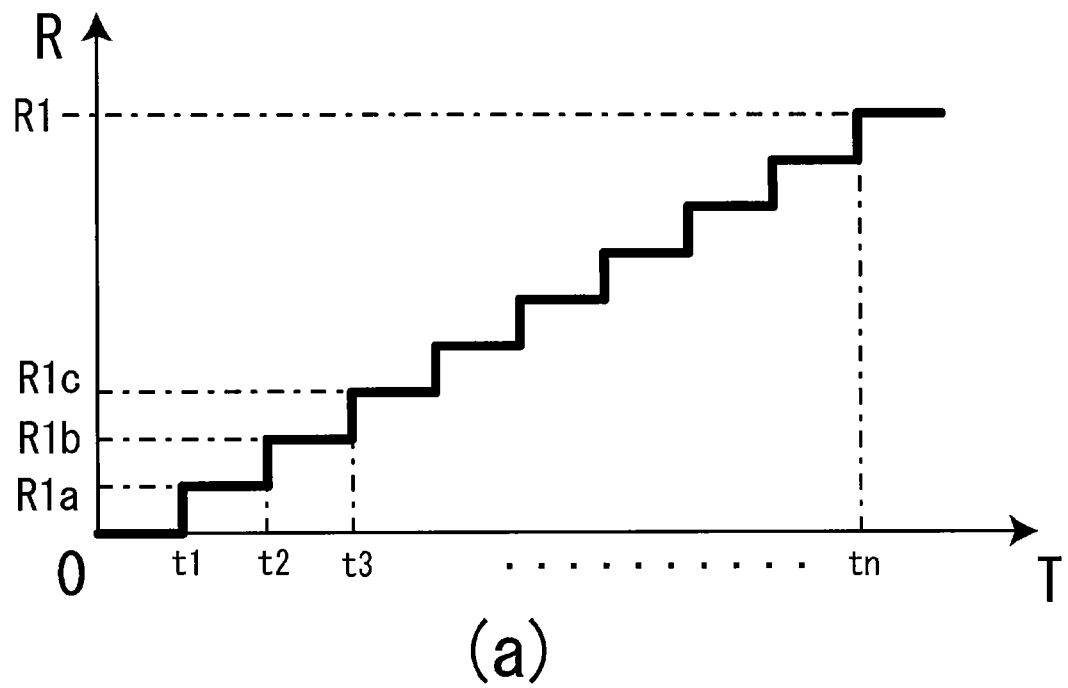
FIG. 6 is a view illustrating embodiment of the setting of the rack position according to the elapsed time.
Figure 6:
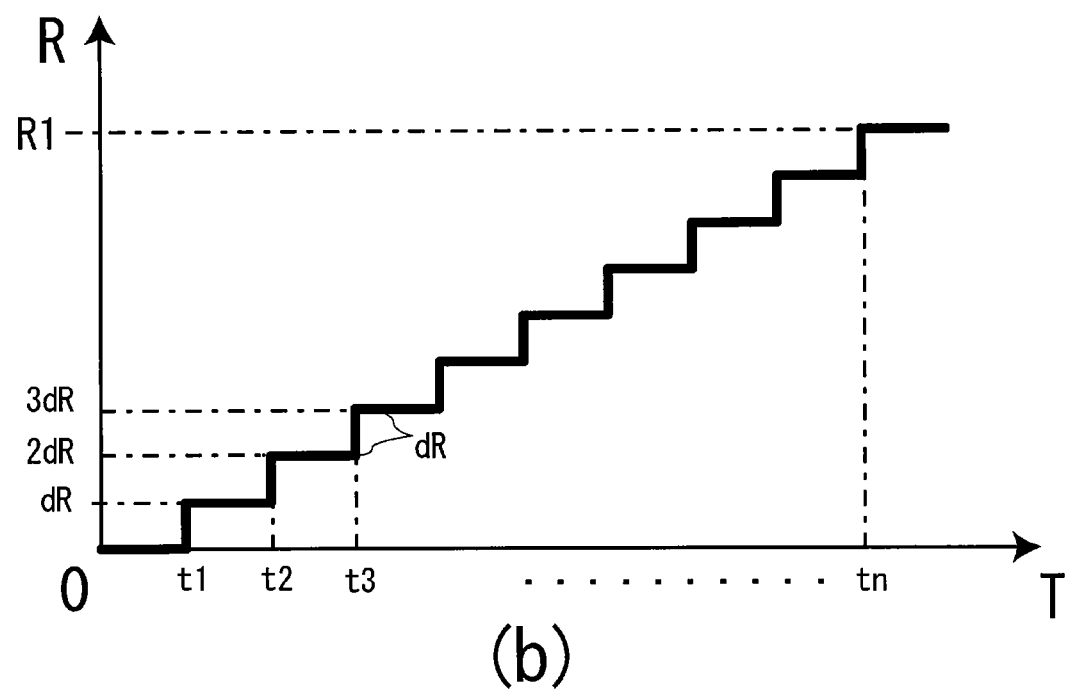

FIG. 6 illustrates an embodiment of the setting of the rack position according to the elapsed time. FIG. 6(*a*) illustrates an embodiment of the setting of the rack position according to the elapsed time. FIG. 6(*b*) illustrates an embodiment of the setting of the operating value of the rack according to the elapsed time.

In this embodiment as shown in the FIG. 6(*a*), the elapsed time, and the operated amount of the rack is divided into plural steps; each rack positions (R1a, R1b, R1c . . . R1) are set according to the elapsed times (t1, t2, t3 . . . tn). And the controller 31 outputs the target value for the operation of the rack 45 according to this setting. As a result, the rack 45 is gradually operated to the starting fuel position R1. Thus, the target value of the rack 45 is set in plural steps according to the elapsed time from the engine start, and the target value is selected, so that easy setting of the operating speed of the rack, smooth engine start, saving a fuel and suppressing black smoke in starting the engine is achieved.

In this embodiment as shown in FIG. 6(*b*), the operating amount dR is set according to the elapsed times (t1, t2, t3 . . . tn), and the rack 45 is operated in the amount dR after a certain period passes. The controller 31 outputs the rack position that is added to the former position in the amount dR when a certain period passes. As a result, the rack 45 is gradually operated to the starting fuel position R1.

The method to control the inputs for the electronic governor 41 by means of a PI gain is to adjust the operating speed of the rack 45 in a PI control used for the control of the electronic governor 41.

Figure 7:
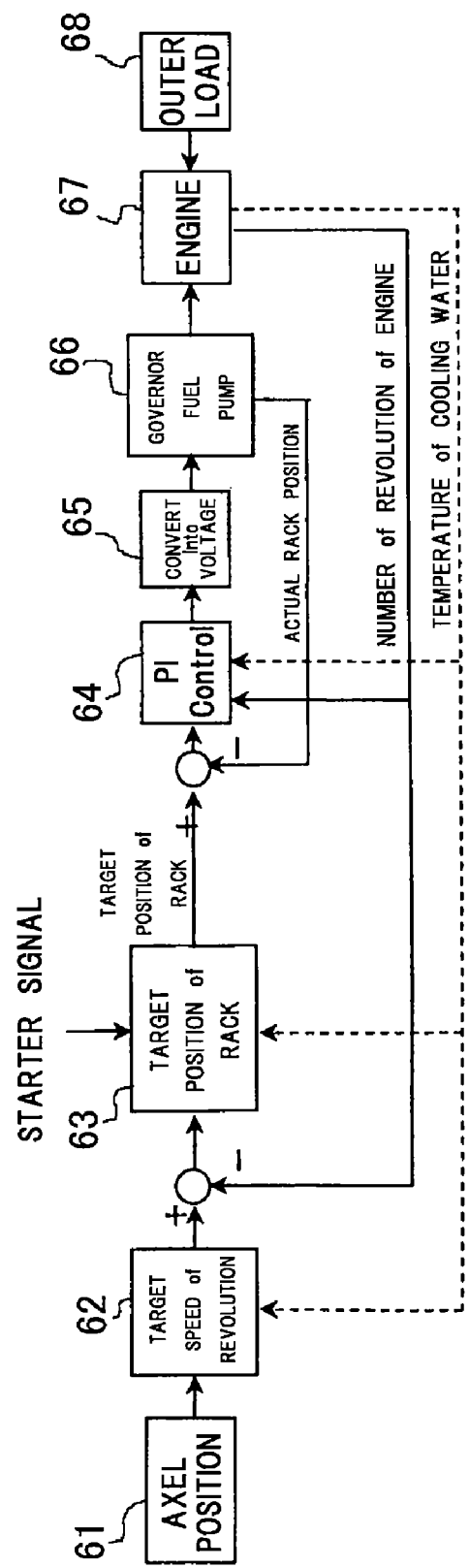
FIG. 7 is a flow sheet illustrating the control of the electronic governor.

FIG. 7 illustrates a flow sheet illustrating the control of the electronic governor. In this embodiment as shown in FIG. 7, the position of an axle is detected in a processing 61. In a processing 62 the target speed of revolution of the engine is computed by the detected position of the axle. In a processing 63 the target position of the rack is computed by comparing the computed target speed of revolution of the engine with the speed of revolution of the engine. The PI control is done in a processing 64 by comparing the computed target position of the rack with the position of the rack. The control signal from the processing 64 is converted into voltage in a processing 65 and is output to the electronic governor 41 comprised in the fuel injection pump in a processing 66. In the processing 66, the actual position of the rack is detected and used for the PI control in the processing 64. The number of revolution of the engine 1 in a processing 67 is changed by adjustment of the electronic governor 41 in the processing 66. The number of revolutions and the temperature of the cooling water of the engine 1 are detected in the processing 67 and are referred in the processing 64, 63 and 62. The condition of the engine 1 is affected by an outer load 68. In the processing 63, a starting signal for the starter motor 32 is detected, and the control of the rack is done according to the engine start.

A method of controlling the output for the electronic governor 41 by means of the PI gain is to slow the operating speed of the rack by the PI gain at the PI control for the electronic governor 41. A feedback gain for the electronic governor 41 is weakened in starting the engine, so that a response to the target position is slowed and the operating speed of the rack 45 is slowed. As a result, it is easy and inexpensive to apply this to an existing composition.

It is possible to adjust the operating speed of the rack by the temperature.

Figure 8:
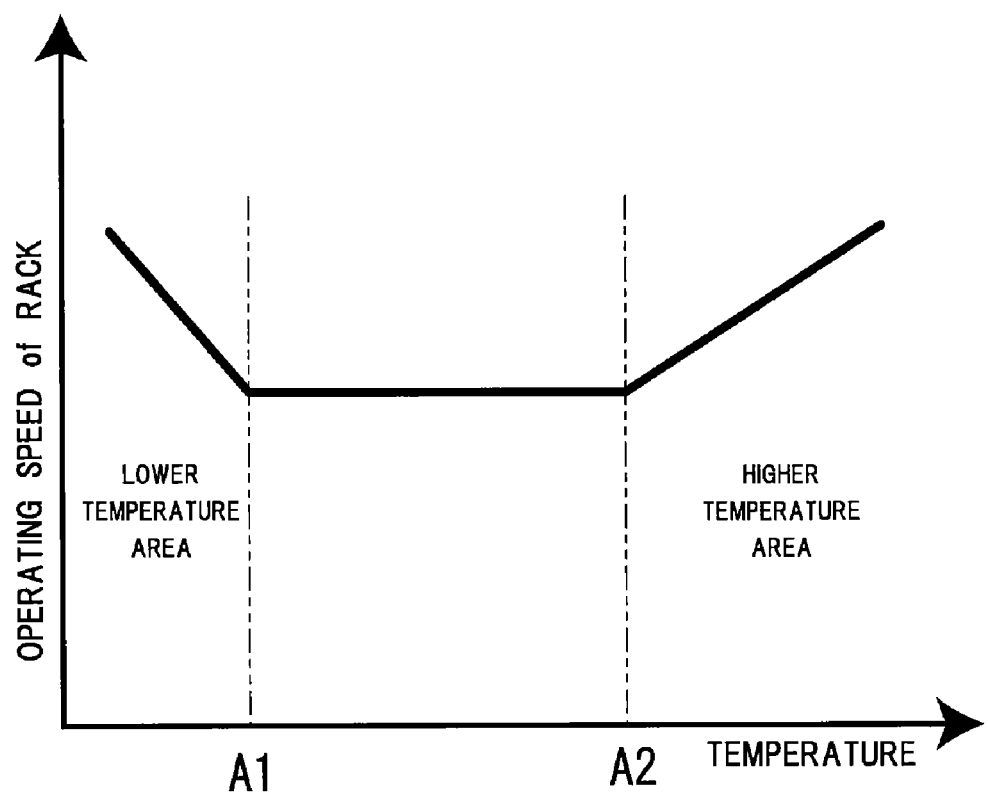
FIG. 8 is a view illustrating relation between the speed of the rack and an atmospheric temperature.

FIG. 8 illustrates a relation between the speed of the rack and a temperature. An axis of ordinate is the speed of the rack, and an axis of abscissa is the temperature.

A resistance of the lubricant at the lower temperature and an increase of fuel fluidity at the higher temperature increase the amount of fuel injection needed to start the engine 1. For this purpose, an increase of the operating speed of the rack in a certain amount at low temperature or at high temperature, keeps the engine start smooth. It is also possible to adjust the operating speed of the rack by means of increasing or decreasing the time to reach the starting fuel amount position.

In FIG. 8, the area that is lower than a temperature A1 is provided a lower temperature area and the area that is higher than a temperature A2 is provided a higher temperature area, and the area between the A1 and the A2 is provided a normal temperature area. In the lower temperature area, the lower the temperature is, the more the operating speed of the rack is increased. In the higher temperature area, the higher the temperature is, the more the operating speed of the rack is increased. As a result, even if the temperature of the engine 1 is cold or hot, smooth starting of the engine can be achieved.

The relation between the operating speed of the rack and the temperature is memorized as a map in the controller 31, and the operating speed of the rack according to the temperature is selected and the rack 45 is operated. The temperature that adjusts the operating speed of the rack is detected by a thermo sensor, as the temperature of the cooling water of the engine 1, neighborhood of the engine, fuel, or lubricant.

A control flow of the amount of fuel injection in starting the engine is described below.

Figure 9:
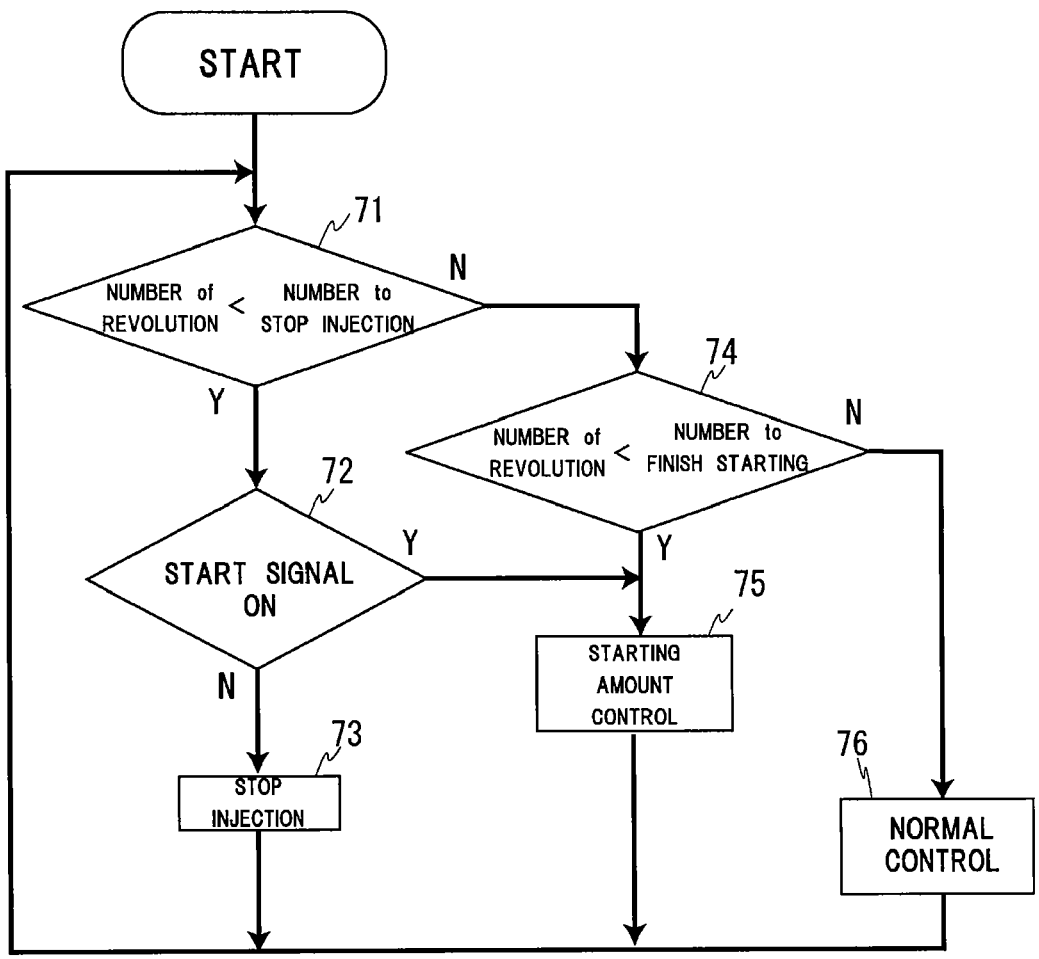
FIG. 9 is a flow sheet illustrating the control of the engine.
Figure 10:
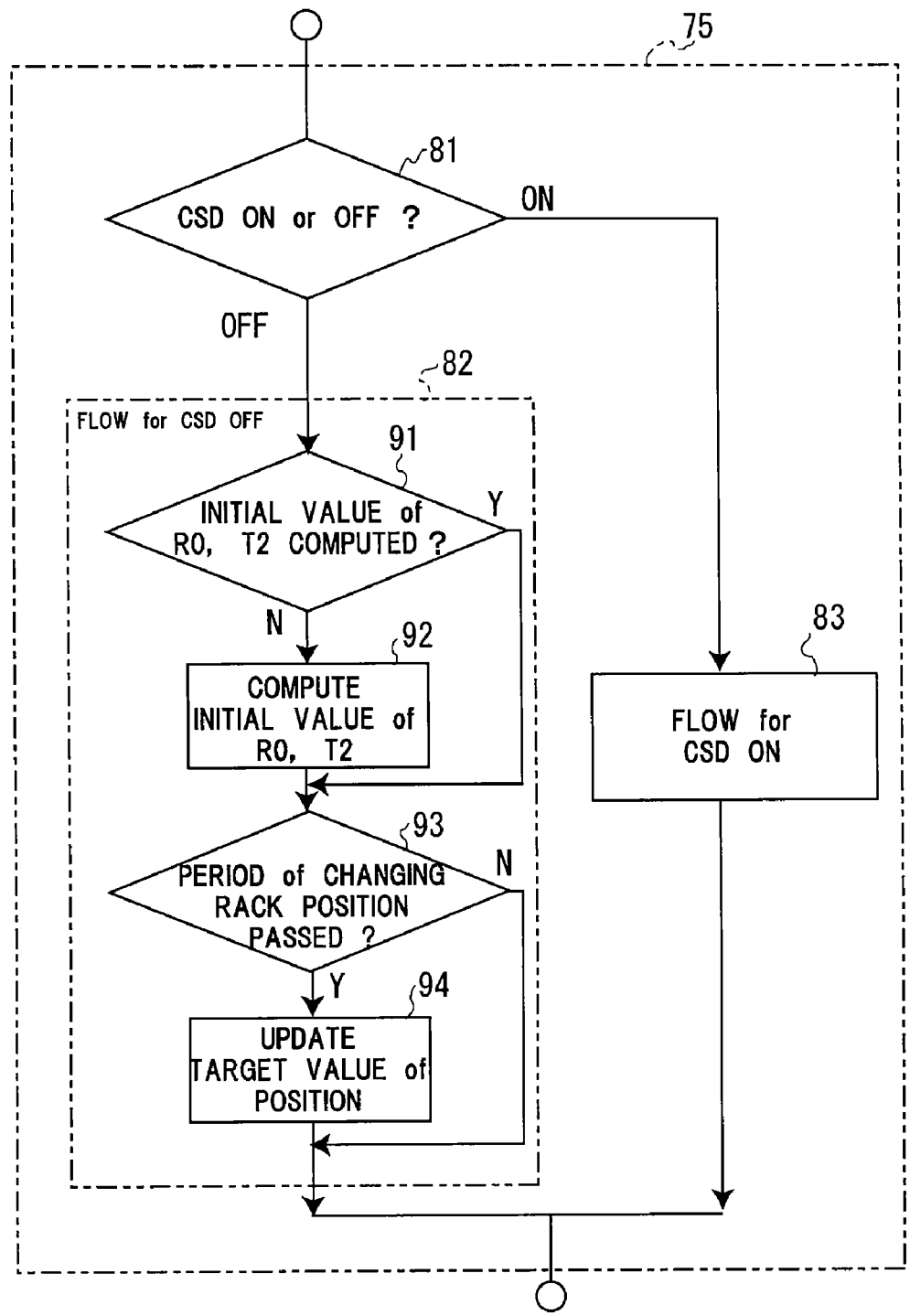
FIG. 10 is a flow sheet illustrating the control of the amount of fuel injection in starting the engine.

FIG. 9 is a flow sheet illustrating the control of the engine. FIG. 10 is a flow sheet illustrating the control of the amount of fuel injection in starting the engine.

The number of revolutions of the engine and predetermined number of revolutions to stop fuel injection are compared in a processing 71. If the number of revolutions of the engine is smaller than a predetermined number of revolutions to stop fuel injection, then whether the start switch 36 is set in "START" position or not (whether the signal to start is turned on in the controller 31 or not) is detected in a processing 72. If the start switch is not set in "START" position, then fuel injection stop control is done in a processing 73, and it returns to the processing 71. On the other hand, if the start switch is set in "START" position, then the starting amount control of fuel injection in the fuel injection pump 34 is done in a processing 75.

If the number of revolutions of the engine is larger than a predetermined number of revolutions to stop fuel injection, then the number of revolutions of the engine and predetermined number of revolutions to finish starting the engine are compared in a processing 74. If the number of revolutions of the engine is smaller than the predetermined number of revolutions to finish starting the engine, then the processing 75 is done. On the other hand, if the number of revolutions of the engine is larger than the predetermined number of revolutions to finish starting, then the fuel injection in the fuel injection pump 34 is normally controlled in a processing 76.

In the control flow of the amount of fuel injection in starting the engine, as shown in FIG. 10, the control flow of fuel injection is selected according to the operating condition of the CSD 50 that controls the amount of fuel injection and the timing of fuel injection according to the combustion temperature. The control flow of fuel injection computes the target value of the rack position in starting the engine.

The operating condition of the CSD 50 is distinguished in a processing 81. If the CSD 50 is operating, then the fuel injection is controlled according to the condition under which the CSD is operating, in a processing 83. If the CSD 50 is not operating, then the fuel injection is controlled according to the condition under which the CSD is not operating, in a processing 82. The control flow of the processing 82 and the processing 83 are the same. The parameters to compute the target value of the rack position in the processing 82 and in the processing 83 are different. So, the control of fuel injection according to the processing 82 is described below. In the processing 82, the presence of the computation of the starting fuel amount position R0 of the rack 45 and the time T2 for the rack 45 to reach the R0 is distinguished in a processing 91. If they have not been computed, then the time T2 is computed in a processing 92, and if they have been computed, then the control flow is advanced to a processing 93. In the processing 93, whether a period of changing the position of the rack is passed is distinguished. If the period has not passed, then the processing 82 will end. If the period has passed, then the target value of the position of the rack 45 will be updated in a processing 94. Thus, the electronic governor 41 operates and moves the rack 45 to the target position.

The amount of fuel injection is controlled according to the operating condition of the CSD 50, thus by means of adjusting to the thermal-environmental change around the engine 1, to smoothly start the engine and to suppress black smoke in starting the engine are achieved effectively.

Second Embodiment

A second embodiment of the invention about a control of the rack 45 in starting the engine is described below. In this embodiment, the operation of the rack is controlled in two steps; first, the rack 45 is operated to the position where the fuel can be compressed and supplied. Second, the rack 45 is gradually operated to the increased side. As a result, it is possible to shorten the time to operate the rack 45 in an area where the fuel cannot be compressed and supplied. And it is allowable to shorten the time for the engine 1 to be ignited.

Figure 11:
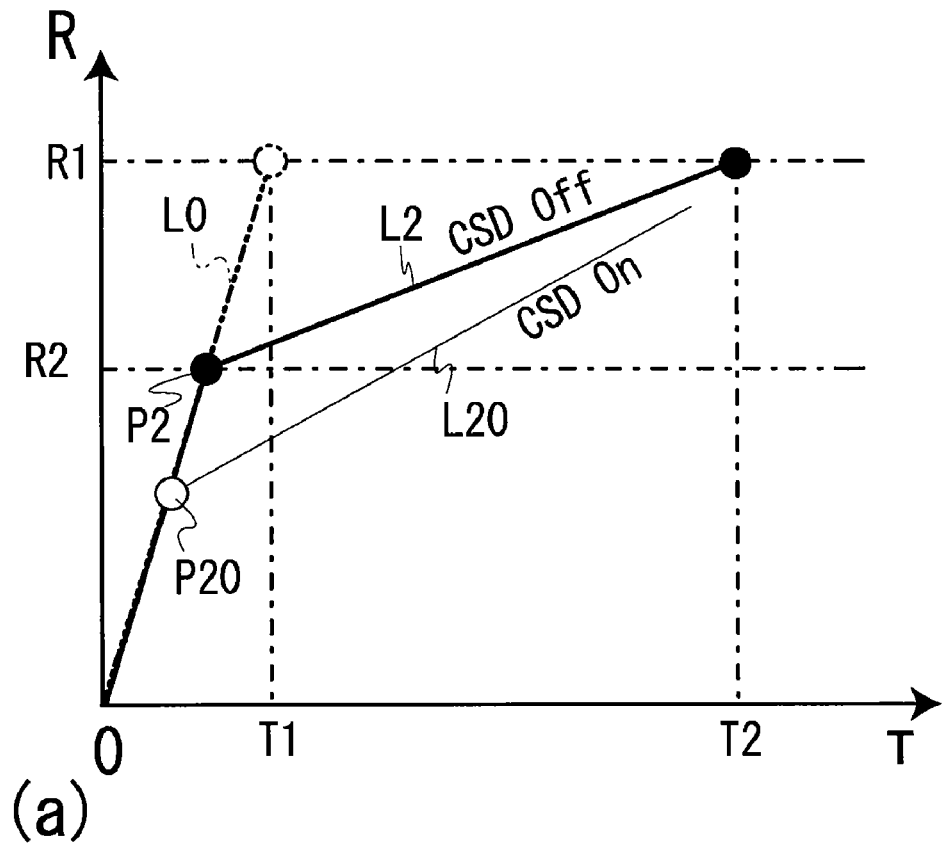
FIG. 11 is a view illustrating operation of the rack in the second embodiment.
Figure 11:
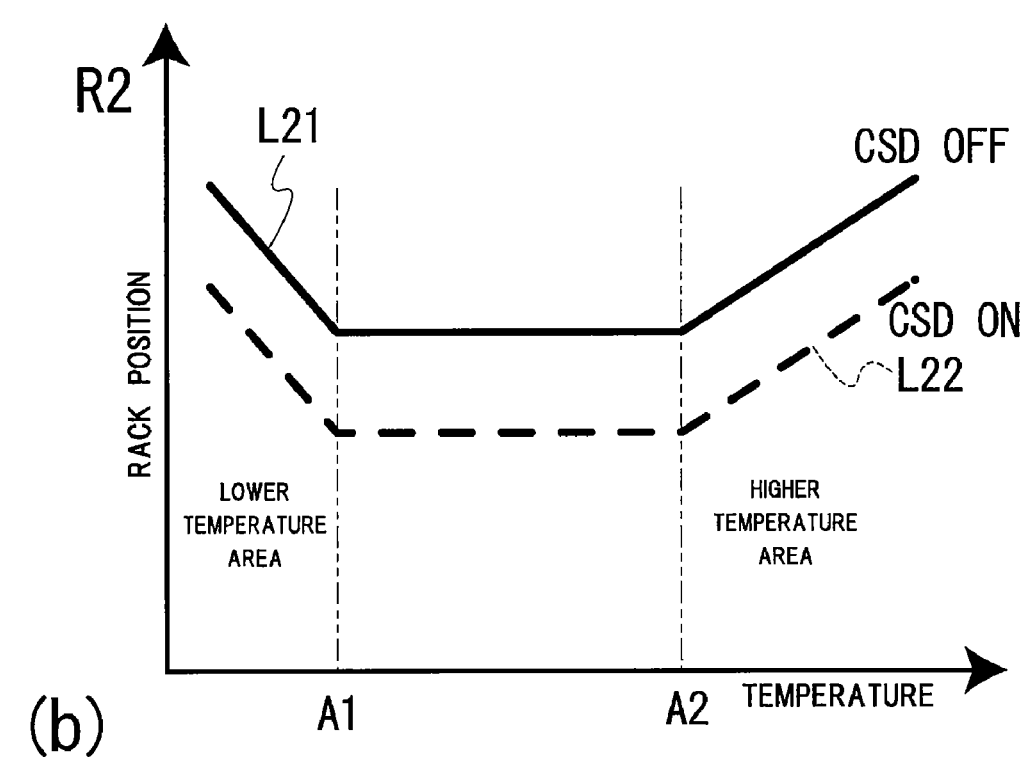

FIG. 11 illustrates an operation of the rack in this embodiment. FIG. 11(a) illustrates a relation between the rack position and the elapsed time. FIG. 11(b) illustrates a relation between the rack position at a point P2 and the temperature. In FIG. 11(a), an axis of ordinate is an ordered position of the rack, and an axis of abscissa is the elapsed time from starting. A two-dot chain line L0 is the line showing the conventional operation of the rack and a line L2 is the line showing the operation of the rack according to the embodiment. The position R1 is the starting fuel amount position, the position R2 is the rack position where the fuel can be compressed and supplied in the fuel injection pump 34.

The rack 45 is operated to the position R2, after the start operating of the engine 1 is begun. The rack 45 is gradually operated to the position R1 from R2, that is, the operating speed before the point P2 is same as the conventional one, and the operating speed after the point P2 is slower than the conventional one.

In this embodiment, the time to operate the rack to the starting fuel amount position T2 is the same as in first embodiment.

In the control of the rack after the point P2, the method like the above mentioned can be also taken. As a result, it is possible to shorten the time to operate to the point P2, so that when the control signal for still slower operation is output after the point P2, it is possible for an operator to smoothly start the engine 1.

It is allowable to decrease the amount of increased fuel after the point P2 where the fuel is actually compressed and supplied, so that it is possible to appropriately supply the fuel and prevent surplus supply of the fuel to the cylinder of the engine 1. The above-mentioned method is also available for controlling the movement of the rack 45 after the point P2.

When the rack is operated from the lowest position to the starting fuel amount position, the operating speed is set in two steps. The later operating speed of the rack is reduced less than the operating speed of the rack up to the set intermediate rack target value R2. As a result, it is possible to shorten the time for the rack 45 to be operated to the minimum necessary fuel position for start the engine and it is possible to improve the response to the operation of the start switch.

The point P2 is adjustable according to the temperature and is able to be controlled by means of the temperature detected by the controller 31 and the combustion temperature detected by the CSD 50.

In FIG. 11(b), an axis of ordinate is the set rack position R2 at the point P2, and an axis of abscissa is the temperature. A line L21 is the line showing the change of the R2 according to the temperature when the CSD 50 is turned off. A broken line L22 is the line showing the change of the R2 according to the temperature when the CSD 50 is turned on.

A resistance of the lubricant at the lower temperature and an increase of fuel fluidity at the higher temperature increase the amount of fuel injection needed to start the engine 1. For this purpose, the lowest position to start the engine becomes higher fuel position than the normal condition, at the lower temperature or higher temperature. The controller 31 detects the temperature, and then it controls the first target position R2 according to the temperature, so that it is possible to shorten the time it takes to ignite the engine and the time that the rack reaches the starting fuel amount position.

In FIG. 11(b), the area that is lower than a temperature A1 is provided a lower temperature area and the area that is higher than a temperature A2 is provided a higher temperature area, and the area between the A1 and the A2 is provided a normal temperature area. In the lower temperature area, the lower the temperature is, the more the operating speed of the rack is increased. In the higher temperature area, the higher the temperature is, the more the operating speed of the rack is increased. As a result, even if the temperature of the engine 1 is cold or hot, smooth starting of the engine can be achieved. The relation between the first target position of the rack 45 and the temperature is memorized as a map in the controller 31, and the operating speed of the rack according to the detected temperature is selected and the rack 45 is operated. The temperature that adjusts the first target position of the rack is detected by a thermo sensor, as the temperature of the cooling water of the engine 1, fuel, lubricant, or the engine neighborhood. When the CSD 50 is turned on, the position of the rack set by the R2 is adjusted according to the situation. When the CSD 50 is off, the position R2 is controlled as shown by the line L21. When the CSD 50 is turned on, as shown by the broken line L22, the position R2 is reduced from the condition that the CSD 50 is off, and the amount of fuel supplied in starting the engine is adjusted. As a result, suppressing black smoke in starting the engine and saving fuel by means of suppressing the surplus supply to the engine is achieved.

Moreover, the operating speed of the rack 45 after the point P2 can be adjusted according to the temperature or the condition of the CSD 50. Thus, the engine start that is more adjusted to the condition of the engine is achieved.

For example, if the temperature of the cooling water of the engine 1 is lower than a certain temperature and the CSD 50 is turned on, the position of the rack corresponding to the point P2 reduced to a point P20 and the operating amount of the rack is increased after a point P22. The operating speed of the rack before the point P20 is quick, and the rack position gradually becomes increased after the point P20. In this situation, the inclination of the line L20 is larger than that of the line L2. Thus, if the temperature around the engine is low, the rack position corresponding to the point P2 is reduced, and the operating speed of the rack for increased side is increased, so that saving a fuel and suppressing black smoke is achieved.

Figure 12:
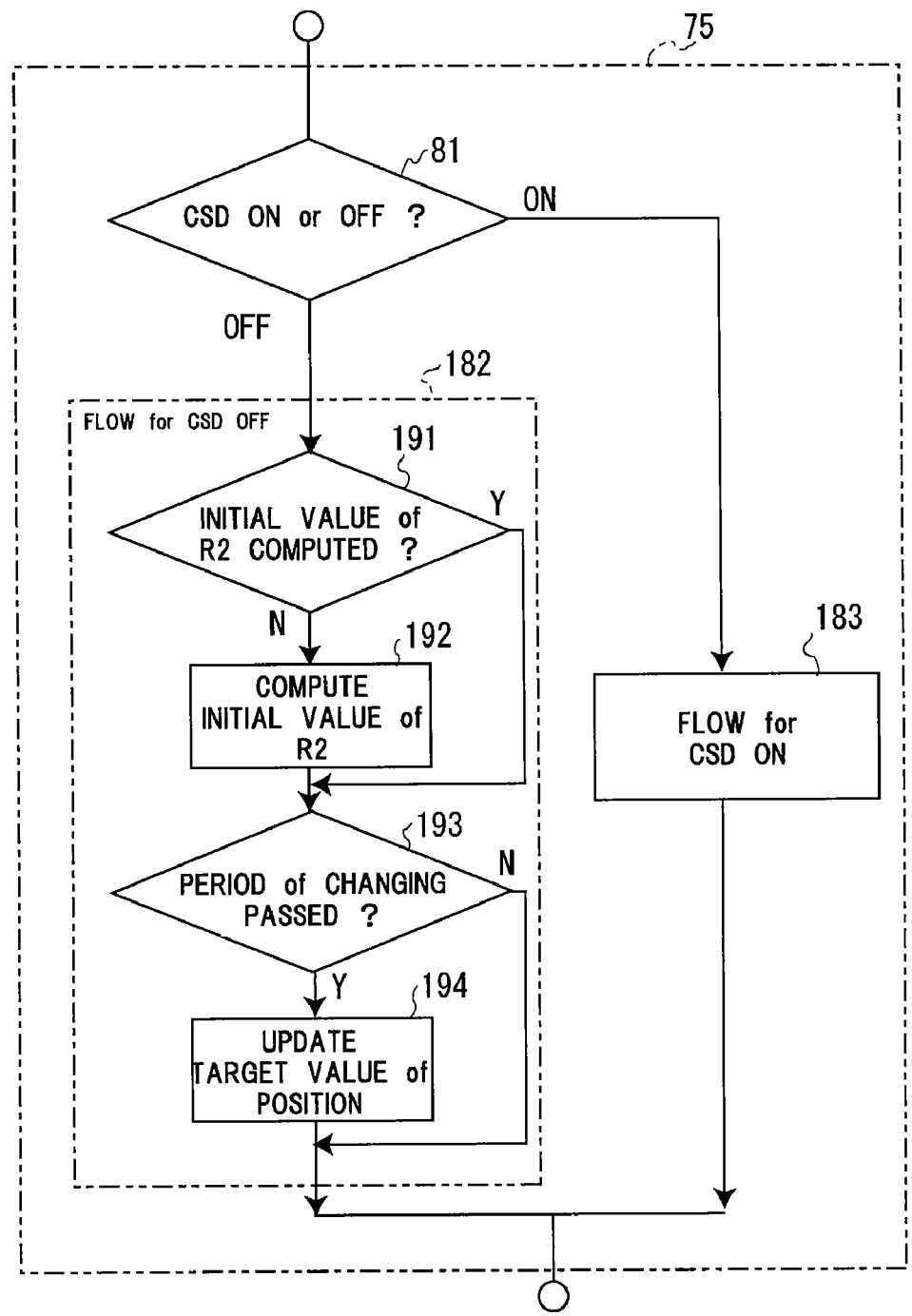
FIG. 12 is a flow sheet illustrating the control of the amount of fuel injection in starting the engine.

FIG. 12 is a flow sheet illustrating the control of the amount of fuel injection in starting the engine.

The flow sheet as shown in FIG. 12 corresponds to the processing 75 described in the first embodiment, and is fundamentally able to use the control flow as shown in FIG. 9.

The flow sheet as shown in FIG. 12 is to select the control flow of the fuel injection according to the operating condition of the CSD 50. The first target value of the rack position R2 is computed by the control flow of the fuel injection.

The operating condition of the CSD 50 is distinguished in the processing 81. The control flow of a processing 182 and a processing 183 are the same, so the processing 182, for instance, is described below. In the processing 182, the presence of the computation of the first target value R2 of the position of the rack 45 is distinguished in a processing 191. If the R2 has not been computed, then the R2 is computed in a processing 192, and if the R2 has been computed, then the control flow advances a processing 193.

The processing 193 controls the operation of the rack after the point P2 and controls the position of the rack 45 corresponding to the predetermined update period.

In the processing 193, whether a period has passed or not is distinguished. If the period has not passed, then the processing 182 is finished, and if the period has passed, then the target value of the rack 45 is updated in a processing 194. Thus, the electronic governor 41 operates and moves the rack 45 to the target position.

Third Embodiment

A third embodiment of the invention about a control of the rack 45 in starting the engine is described below.

In this embodiment, the operating speed of the rack is controlled in three steps; first, the rack 45 is operated to the position where the fuel can be compressed and supplied and, second, gradually operated to the increased side. Third, the operating speed of the rack is slowed after the ignition of the engine is recognized. The operating speed before the ignition of the engine is controlled more quick than the operating speed after the ignition of the engine.

As a result, it is possible to prevent the surplus supply of the fuel to the engine, and the lower fuel consumption and suppressing black smoke are achieved.

Figure 13:
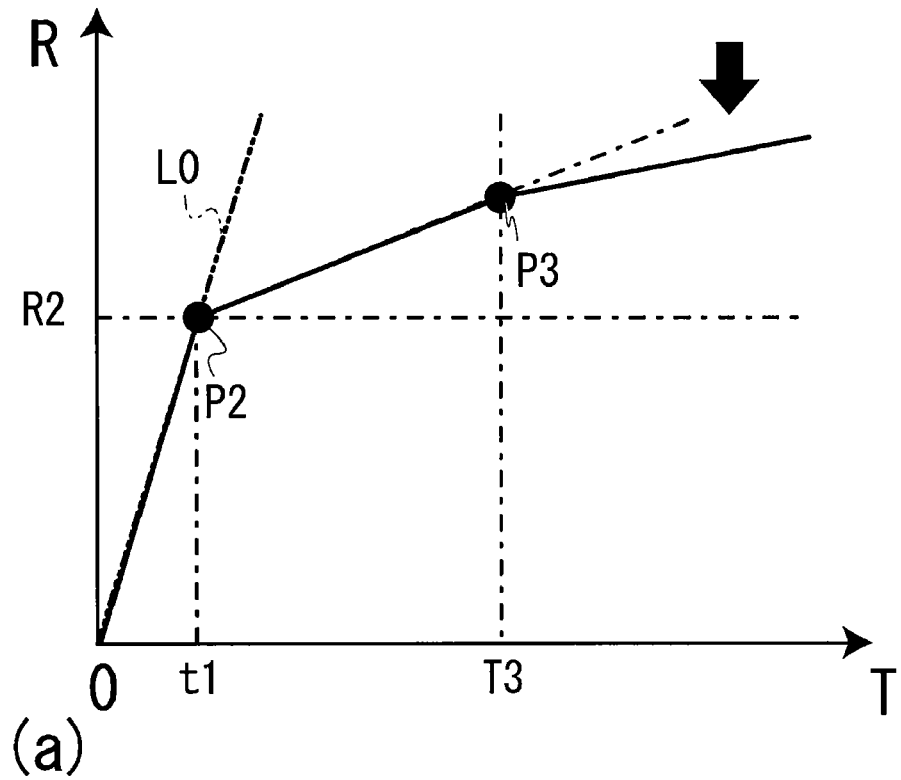
FIG. 13 is a view illustrating an operation of the rack in the third embodiment.
Figure 13:
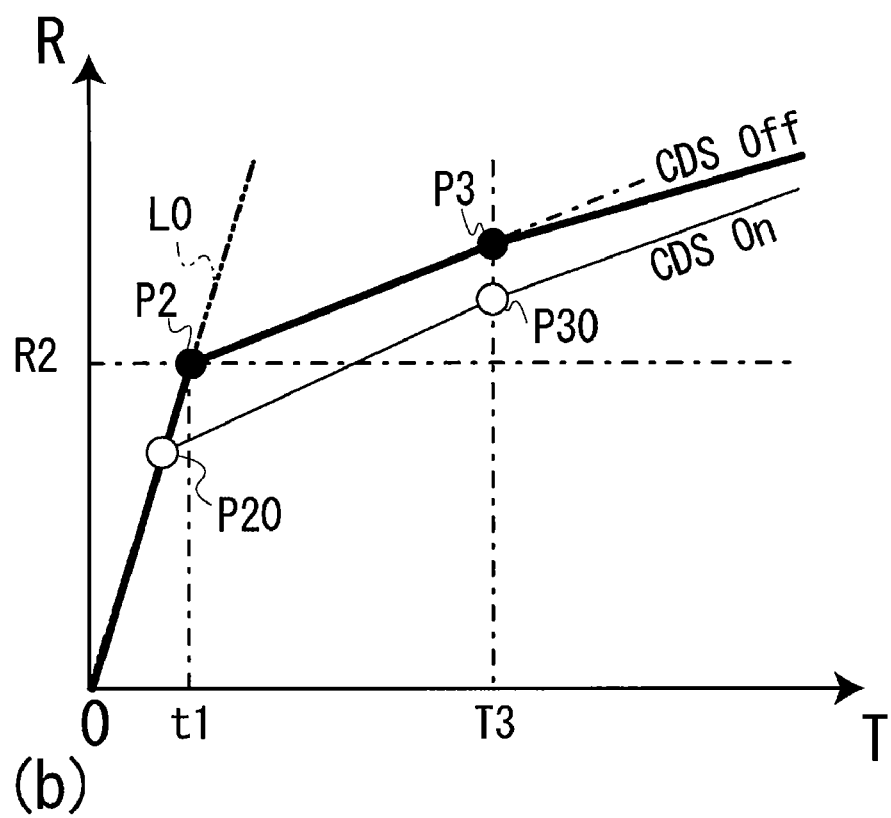

FIG. 13 illustrates an operation of the rack in the third embodiment. FIG. 13(a) illustrates an operation of the rack. FIG. 13(b) illustrates a change of an operation of the rack according to the CSD. In FIG. 13, an axis of ordinate is an ordered position of the rack, and an axis of abscissa is the elapsed time from starting. In this embodiment, the operation of the rack 45 before a point P3 is the same as in second embodiment. The point P3 is the position of the rack where the ignition of the engine 1 is recognized and the time when the ignition of the engine 1 is recognized.

In FIG. 13(a), the rack 45 is operated to the position R2, after the starting operation of the engine 1 is begun. The electronic governor 41 sets the rack to the position R2 as the first target value of the rack position. Thus, the operating speed before the point P2 is same as the conventional one and the rack after the point P2 the rack 45 is operated to the increased side at the set operating speed. In the control of the operation between the point P2 and the point P3, the former control described in second embodiment is available.

After the controller detected the ignition of the engine 1, the rack is operated by the operating speed that is set as the after ignition speed. The pick up sensor 37 detects the speed of revolution of the crankshaft of the engine 1 and is provided around the crankshaft of the engine 1. The ignition of the engine is detected by the pick up sensor 37.

After the ignition of the engine is detected, the operating speed of the rack is reduced less than the operating speed between the point P2 and the point P3. As a result, the engine can start by a minimum amount of fuel injection by raising the amount of fuel injection from the situation of the engine ignition gradually. Saving a fuel in starting the engine and suppressing black smoke and reducing the exhaustion of carbon dioxide are achieved.

In this embodiment, the control according to the CSD is described below.

In FIG. 13(b), the point P20 is the first target position of the rack 45. A point P30 is the position of the rack where the ignition of the engine 1 is recognized and the time when the ignition of the engine 1 is recognized.

If the CSD 50 is turned on, the operating speeds of the rack after the point P20 and after the point P30 are set according to the condition of the CSD 50.

In the composition as shown in FIG. 13(b), the operating speed of the rack between the point P20 and the point P30 is increased compared to the condition that the CSD 50 is turned off. After the point P30, The operating speed of the rack is also increased compared to the operating speed after the point P3.

In the fuel injection pump providing the CSD, the operating speed of the rack after the ignition of the engine is controlled according to the operating condition of the CSD 50, which makes it possible to control the amount of the fuel injection in starting the engine according to the characteristic of the fuel injection pump, to save a fuel, and to suppress black smoke.

Figure 14:
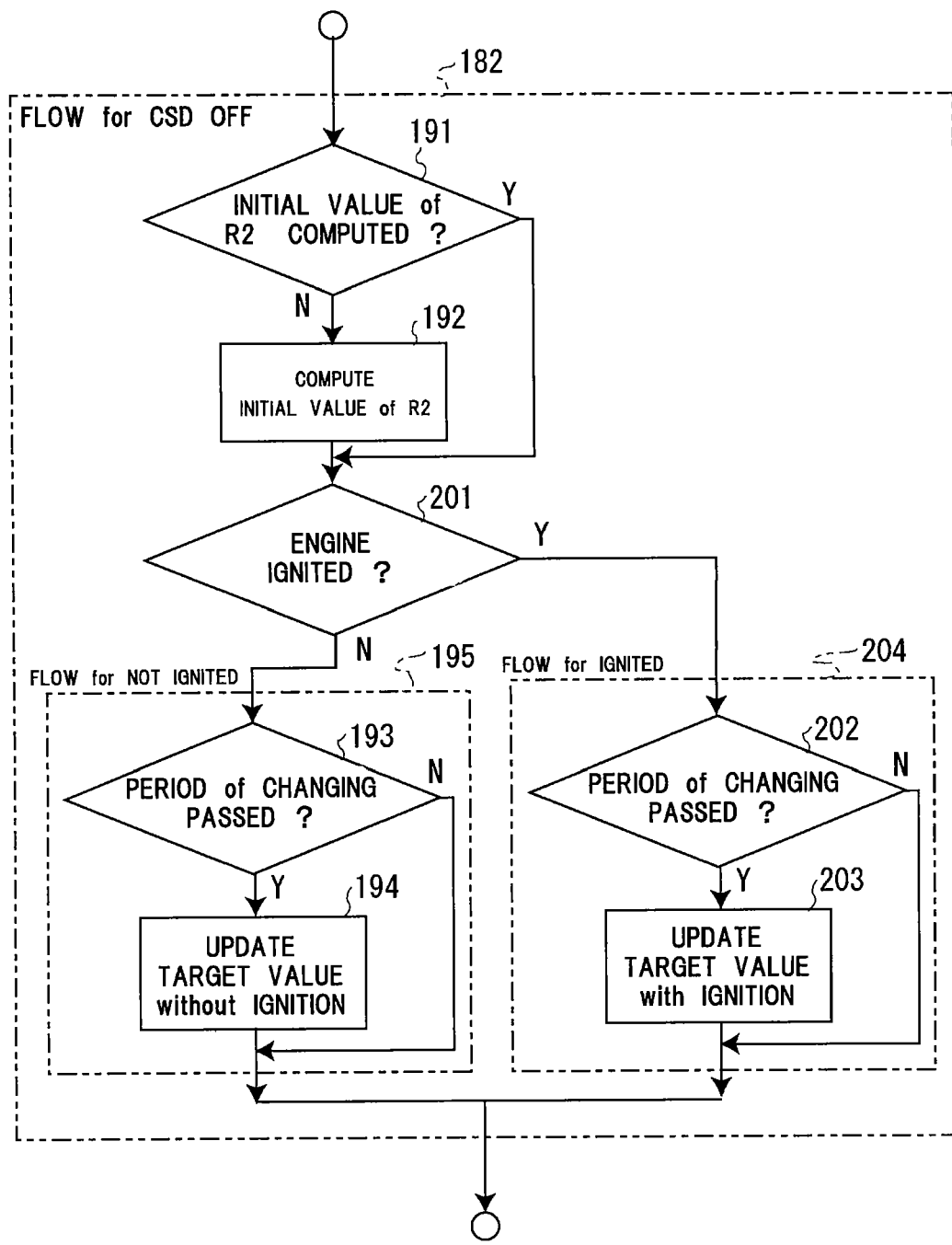
FIG. 14 is a flow sheet illustrating the control of the engine in the third embodiment.

A control system of the third embodiment is described below. FIG. 14 is a flow sheet illustrating the control of the engine in the third embodiment. The flow sheet as shown in FIG. 14 is almost the same as the flow sheet in the second embodiment, but there is a difference in the processing for distinguishing the ignition of the engine and changing the incremental amount of the rack position according to the presence of the ignition of the engine. The flow until the processing 192 is similar to the second embodiment. The ignition of the engine is distinguished in a processing 201. If the engine 1 has not ignited, then the control is done according to the control flow for the situation that has not ignited in a processing 195. The update period is distinguished in a processing 193, and the target position of the rack is set in a processing 194, according to the amount of the rack movement corresponding to the ignition at the update period. If the engine 1 has ignited, then the control is done according to the control flow for the situation that has ignited in the processing 204. The update period is distinguished in a processing 202, and the target position of the rack is set in a processing 203, according to the amount of the rack movement corresponding to the ignition at the update period. In this embodiment, the amount of the rack movement at the update period is set as follows; the amount of the rack movement when the engine ignites is smaller than the amount of the rack movement when the engine doesn't ignite.

As a result, it is possible to control the amount of fuel injection according to the condition of the engine and to save fuel in starting the engine and to improve the durability of the filter and the catalyst in the exhaust passage.

Fourth Embodiment

A fourth embodiment of the invention is described below.

Figure 15:
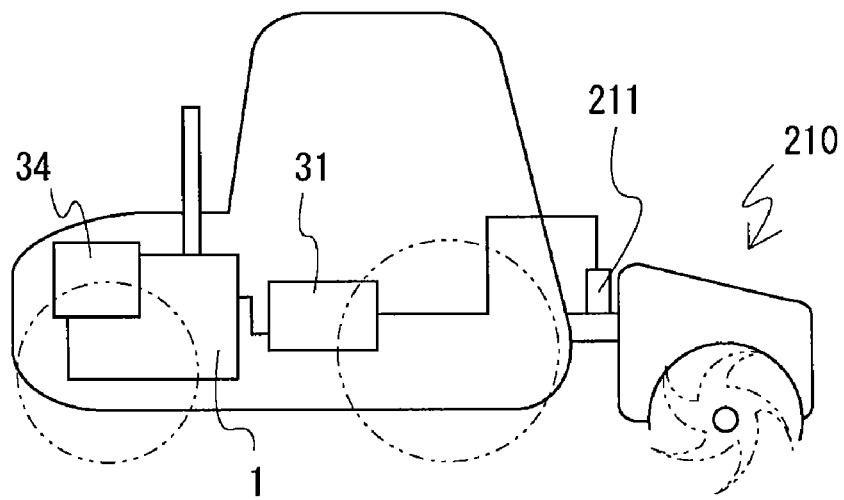
FIG. 15 is a view illustrating an operation of the rack in the forth embodiment.
Figure 15:
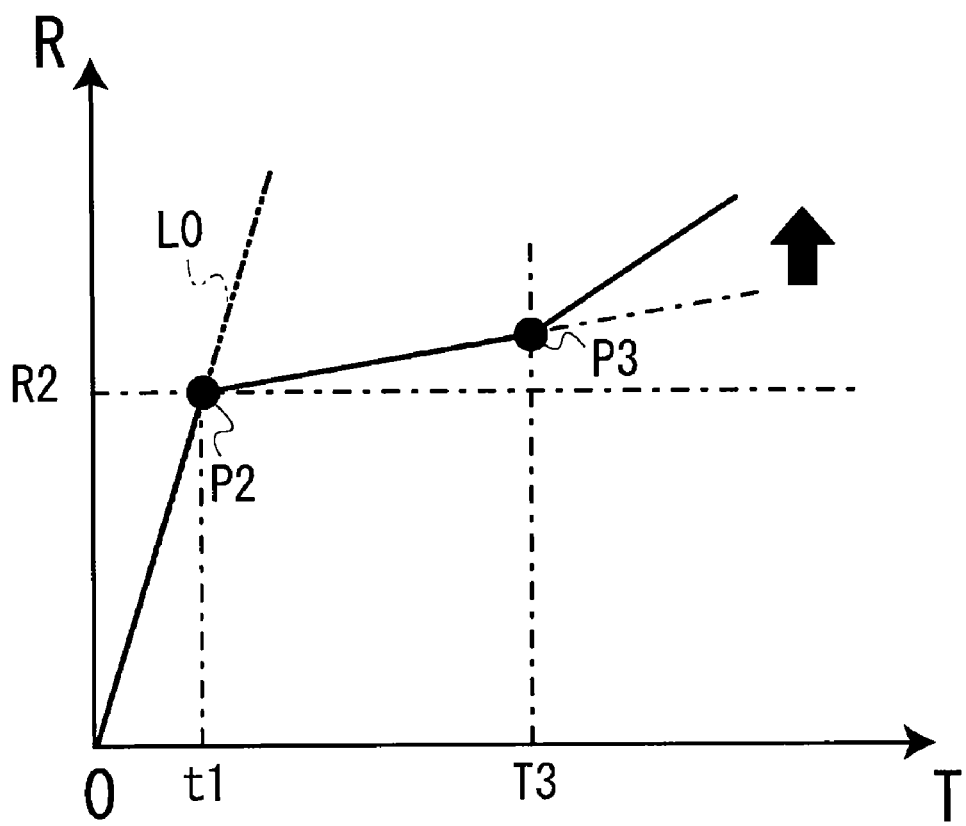

FIG. 15 illustrates an operation of the rack. FIG. 15(a) is a schematic illustration illustrating a detection mechanism of a work machine. FIG. 15(b) illustrates a relation between the rack position and the elapsed time in being equipped with the work machine.

In this embodiment, the operating speed of the rack is controlled according a load given to the engine when the engine ignites. For example, when a work vehicle comprising the engine 1 is equipped with the work machine 210, the work machine 210 gives load to the engine 1 when the engine ignites. It is necessary, in this case, to increase the fuel in order to keep the revolution of the engine 1. In this embodiment, the connection of the work machine is detected by the controller 31 through a sensor 211 and others. If the engine 1 receives loads in starting the engine 1, then the speed of the rack is increased. If the engine 1 receives few loads, then the speed of the rack is reduced.

As shown in FIG. 15(a), the sensor 211 is connected to the controller 31, and the connection of the work machine is detected. The controller 31 controls the fuel injection pump 34 according to the connection of the work machine.

In starting the engine, the rack 45 is operated to the rack position R2. After the point P2, the rack 45 is operated to the increased side at the set speed. The controller 31 detects the ignition of the engine and the connection of the work machine. If the work machine is connected, then the rack 45 is operated to the increased side at the set speed in high load. If the work machine is not connected, then the rack 45 is operated to the increased side at the set speed in low load. In this embodiment, the speed at high load is larger than the speed before the engine ignites (between the point P2 and P3). The amount of the fuel supply to the engine is controlled to increase so that the engine 1 is started enough. The speed at low load is smaller than the speed before the ignition of the engine, which saves a fuel for ignition.

In the control flow in this embodiment, a processing to distinguish the connection of the work machine is added to the above-mentioned flow 204, and other control systems are the same as in third embodiment.

Figure 16:
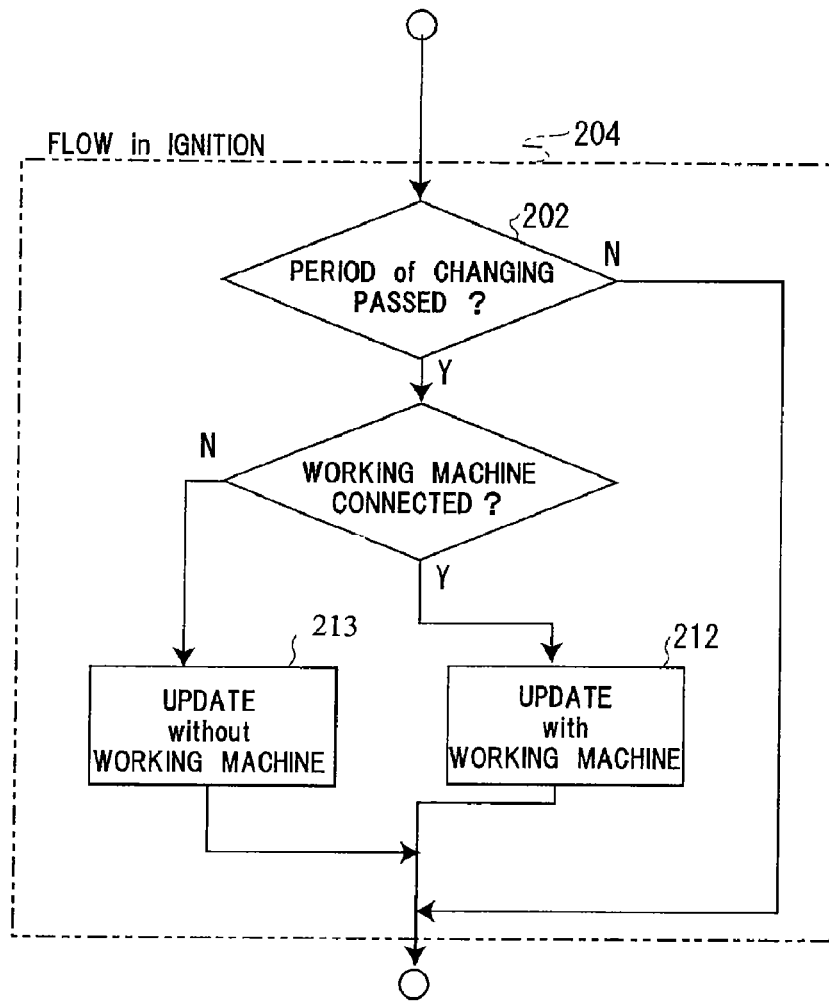
FIG. 16 is a flow sheet illustrating the control of the ignition in the forth embodiment.

FIG. 16 is a flow sheet illustrating the control of the ignition in the forth embodiment. The update period is distinguished in the processing 202. If the update period has passed, then the connection of the work machine is distinguished in a processing 212. If the work machine is connected, then the target value of the rack is updated with the increase in high load in a processing 212. If the work machine is not connected, then the target value of the rack is updated with the increase in low load in a processing 213. In this embodiment, the increase at high load is more than the increase without the ignition of the engine, and the increase at low load is less than the increase without the ignition of the engine.

As a result, it is possible to control the amount of fuel injection according to the loads that are given to the engine in starting the engine and it is possible to save fuel and to suppress black smoke, so that the operator can start the engine without considering the environment around the engine.

In this embodiment, like the above-mentioned, it is also possible to control the speed of the rack according to the condition of the CSD 50. The control adjusting to the condition of the CSD 50 makes it possible to keep advantage of the CSD 50, to save fuel and to suppress black smoke in starting the engine.

Fifth Embodiment

A fifth embodiment of the invention is as shown in the presentation below, making reference to the drawings.

The embodiment is about a fuel injection pump comprising a mechanical governor. The control of the rack 45 is the same as the above-mentioned control system.

Figure 17:
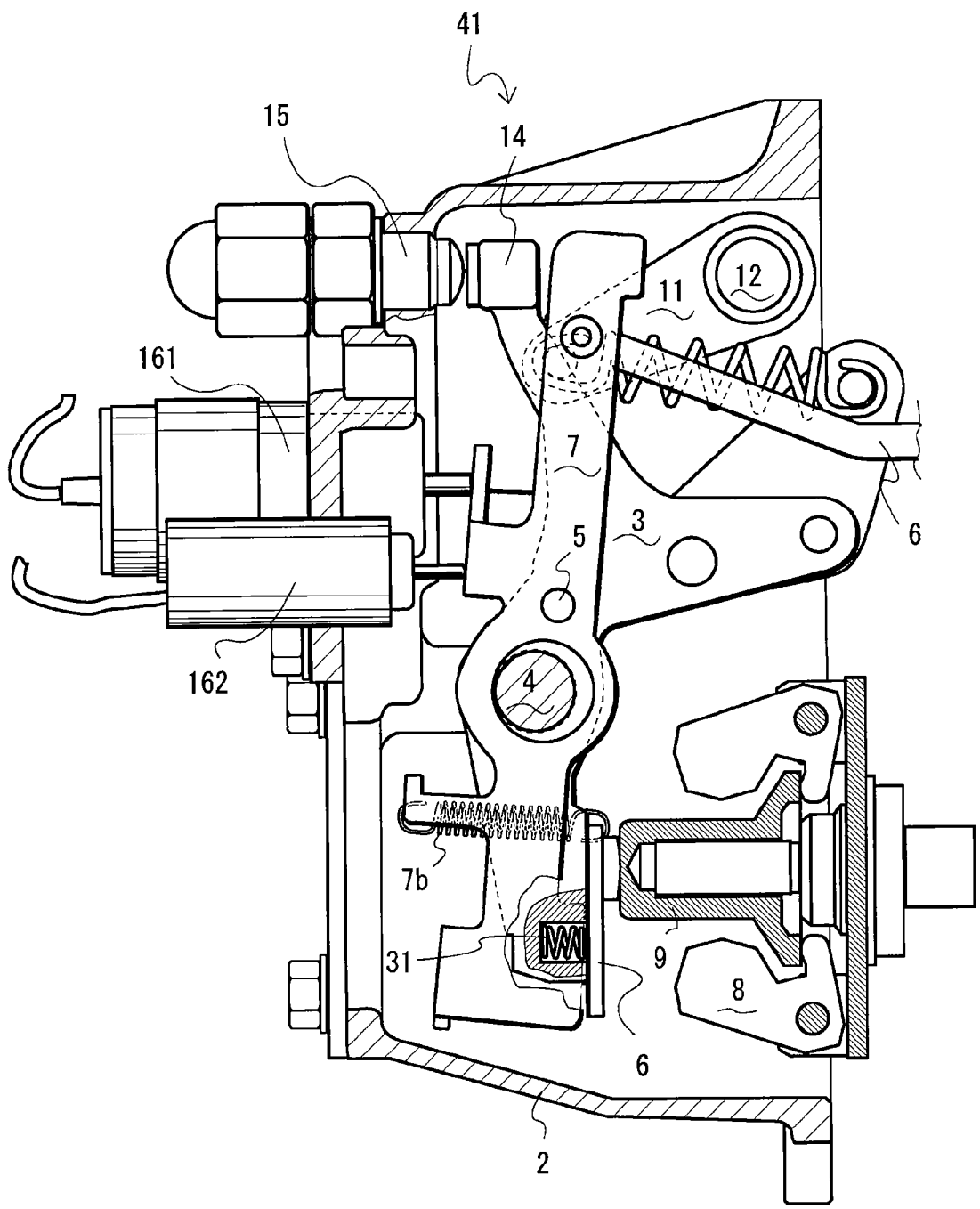
FIG. 17 is a partly sectional side view of a governor.

Here, the fuel injection pump is described below. FIG. 17 is a partly sectional side view of the governor.

The pinion 43 is attached and fixed to the plunger 42, and is meshed with the rack 45. The actuator 162 controls the rack 45 to be slid. The actuator 162 slides the rack 45 and changes the position of the rack 45, and the pinion 43 is revolved. Thus, the position of the revolution of the plunger 42 in the sleeve 44 is controlled, and the amount of fuel injection is controlled. The cold start device (hereinafter "CSD") 50 is comprised at the side of the sleeve 44. The CSD 50 changes the amount of fuel injection and the timing of fuel injection according to the combustion temperature.

The composition of the governor 41 is described below. The amount of fuel injection by means of the fuel injection pump is mainly controlled by the amount of revolution of a spring lever shaft 12. The governor 41 exists between the spring lever shaft 12 and the fuel injection pump, and controls the amount of fuel injection according to the number of revolution of the engine or others.

The governor 41 comprises, in a casing 2, a governor weight 8, a slide sleeve 9, and governor lever assembles. The governor lever assembles are configured as a tension lever 3, an adjust lever 6, a governor lever 7. The center of the tension lever 3 is pivoted to a revolution shaft 4, which is provided in the transversal direction. The tension lever 3 is 3 direction extended shape and the edges are extended forward, downward and upward.

The front end of the tension lever 3 is connected to the spring lever 11 through a spring 10. The upper end of the tension lever 3 is a contact portion 14. The lower portion of the tension lever 3 is connected to the adjust lever 6 and to the governor lever 7.

The upper end of the governor lever 7 is connected to the rear end of a control lever 13 operating the rack 45 and the amount of fuel injection is controlled. The adjust lever 6 and the governor lever 7 are connected to the tension lever 3 by means of an adjust shaft 5, and are capable of inclining against the tension lever 3. The adjust shaft 5 is an attachment pin for the governor lever 7 and the adjust lever 6, and is provided in parallel to the revolution shaft 4. The adjust lever 6 and the governor lever 7 are capable of inclining longitudinally.

Lower portion of the adjust lever 6 and the governor lever 7 are connected to a connection spring 7b. The lower portions of the adjust lever 6 and the governor lever 7 are biased to be adjacent to each other.

When the spring lever shaft 12 is revolved clockwise to the drawing, the tension lever 3 is revolved counterclockwise through the spring 10 connected to the spring lever 11 and the control lever 13 is moved backward by the governor lever 7. Thus, the amount of fuel supply to the engine is increased.

When the number of revolutions is increased, the governor weight 8 put out the slide sleeve 9 backward by the centrifugal force, and the adjust lever 6 is pushed in the direction of clockwise. Thus, the tension lever 3 is biased clockwise and inclined in the direction of clockwise without the position of the spring lever 11 is not changed. The control lever 13 is moved forward through the governor lever 7, so that the amount of fuel supply to the engine.

In the rear face of the casing 2, a stop solenoid 161, an actuator 162, and a limiter 15 are provided. The stop solenoid 161 revolves the governor lever 7 forward by means of contacting the governor lever 7 by a rod projected forward when the engine stops. Thus, the rack 45 is slid to the fuel decreased side, and the fuel supply by the fuel injection pump 34 is stopped. On the other hand, when the engine starts, the rod is returned backward and moved away from the governor lever 7. The governor lever 7 is biased toward the casing 2 so that the upper portion of the governor lever 7 is revolved backward.

The tip of a rod comprised in the actuator 162 contacts the rear face of the governor lever 7, so that the actuator 162 can adjust the position of the governor lever 7.

The limiter 15 is provided at the upper portion of the casing 2, and the amount of backward revolution is limited by the contact to a contact body 14.

The control system of the governor 41 by the controller 31 is described below. The controller 31 controls the position of the rack 45 in cranking the engine, so that smooth ignition of the engine is achieved and the black smoke is reduced in starting the engine. When the start switch 36 is set in "OFF" position and the conduction to the stop solenoid 161 is stopped, then the rack 45 is operated to the fuel decreased side and stops at the position; there is no fuel supply. The controller 31 operates the rack 45 to the starting fuel amount position by conducting to the stop solenoid 161 and the actuator 162, so that smooth starting of the engine is achieved.

In this embodiment, the operation of the rack 45 is the same as the operation as shown in FIG. 4.

In this embodiment, the governor lever 7 is controlled by the actuator 162 after the stop solenoid 161 is released.

A stop solenoid can be used as the actuator 162. And it is advantageous as follows to use the stop solenoid whose returning speed (the sliding speed for the increased side) is slower than the stop solenoid 161. By the situation that the actuator 162 contacts to the governor lever 7, it is possible for the governor lever 7 to be held at the speed of revolution for the increased side, and the sudden fuel supply, in starting the engine, is avoided. While the start switch 36 is set in "START" position, the actuator 162 is released and the resistance to the revolution of the governor lever 7 is generated, so that the revolution of the governor lever 7 is controlled.

Thus, it is possible, in handily composing, to control the speed of revolution of the governor lever 7 for the increased side and to gradually increase the fuel supply in starting the engine and try to bring the fuel amount close to the best amount to ignite the engine.

In other composition of the actuator 162, the actuator 162 is configured as a linear solenoid and the stroke of the linear solenoid is controlled sequentially by the controller 31, and the revolution of the governor lever 7 is controlled.

That is, the position of the rack 45 is capable of being controlled by the controller 31 connected to the actuator 162.

Figure 18:
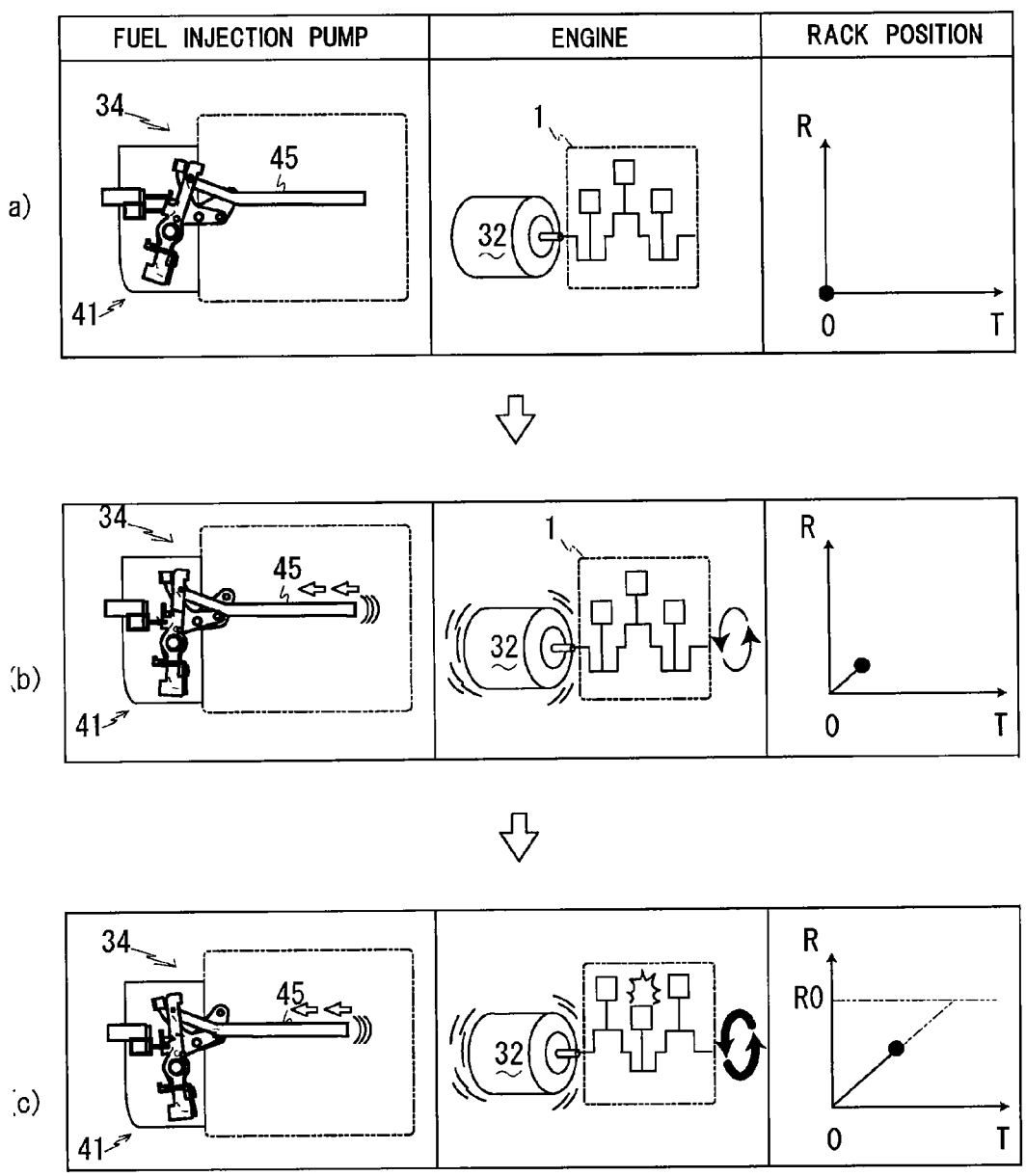
FIG. 18 is a schematic illustration illustrating an operation of the governor and the starter motor.

In this embodiment, as shown in FIG. 18, when the start switch 36 is set in "START" position, the rack 45 is operated from an initial situation as shown in FIG. 18(a) to the starting fuel amount position and the starter motor 32 begins cranking the engine 1. In FIG. 18, a graph on the right side shows the relation between the position of the rack R and the elapsed time T. In this embodiment, the operating speed of the rack 45 is slower than the conventional, so that in the cranking of the starter motor 32, the plural fuel injection is done, as shown in FIGS. 18(b) and (c), before the rack 45 arrival to the starting fuel amount position.

The amount of fuel injection can be gradually increased according to the each timing of the cranking that injects fuel, thus there is little error from the optimum amount of fuel injection for the ignition of the engine 1.

As a result, saving fuel is achieved compared with the case that the rack 45 is operated to the position R0 to supply enough for the engine start from the start.

A method to operate the rack 45 gradually to the starting fuel amount position is a method to change the target value of the rack according to the elapsed time, or a method to control the input to the actuator 162 by means of the PI gain.

In the method to change the target value of the rack according to time, the integration of time is started when the start switch 36 is set in the "START" position. In the controller 31, the target value of the rack 45 according to the integrated time is memorized, and the actuator 162 operates the rack 45 to the position of the target value. Thus, the rack 45 is gradually operated to the fuel increased side in starting the engine.

In the controller 31, the target value of the rack 45 according to the integrated time is memorized in advance, so that the controller 31 can operate the rack 45 to the starting fuel position by means of the actuator 162 more slowly than the conventional.

Figure 19:
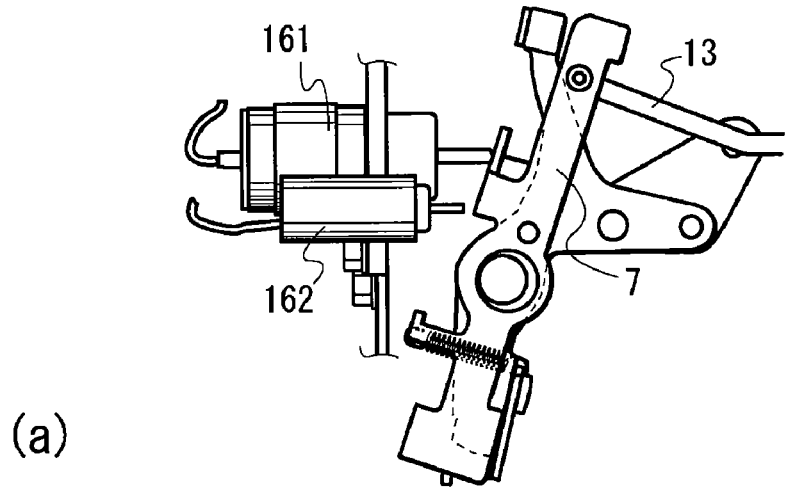
FIG. 19 is a view illustrating an operation of the governor lever and the actuator in the fifth embodiment.
Figure 19:
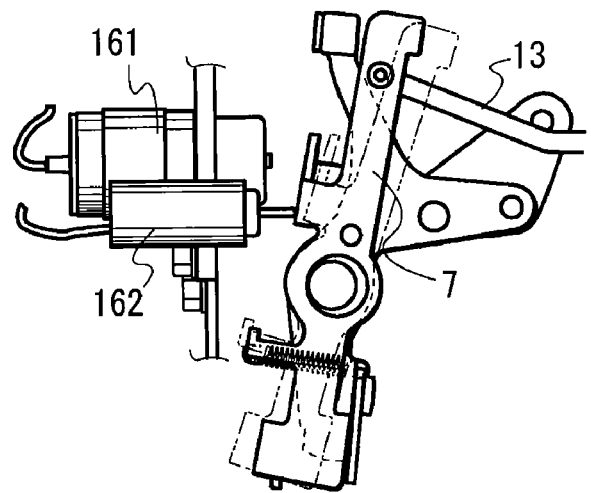
Figure 19:
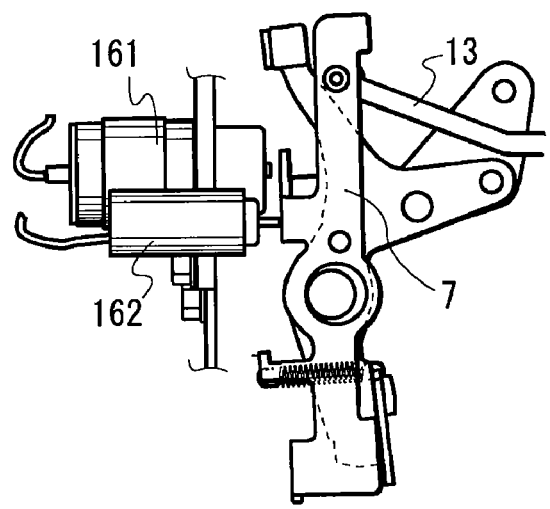

FIG. 19 illustrates an operation of the governor lever and the actuator in a fifth embodiment. The governor lever 7 and the actuator 162 are operated in the order, (a), (b), and (c) in FIG. 19.

As shown in FIG. 19(a), if the engine stops, then the stop solenoid 161 and the actuator 162 are contacted to the governor lever 7, and the stop solenoid 161 limits the backward revolution of the governor lever 7.

When the start switch 36 is set in "START" position, the stop solenoid 161 is slid backward and the contact with governor lever 7 is released. Thus, the governor lever 7 is contacted to the actuator 162 and, the amount of projection of the actuator 162 determines the angle of the governor lever 7. That is, the actuator 162 controls the position of the rack 45 through the governor lever 7 and the control lever 13. The actuator 162 gradually revolves the governor lever 7 backward, and the governor lever 7 contacts the limiter 15. Thus, the maximum amount of backward revolution of the governor lever 7 is determined.

From the stop solenoid 161 is released to the limiter 15 is contacted; the governor lever 7 is controlled by the actuator 162, which can control the fuel supply in starting the engine.

The actuator 162 is connected to the controller 31, which can variously operate.

It is possible to adjust the operating speed of the rack by the temperature, like the above mentioned.

Sixth Embodiment

In a sixth embodiment, a damper adjusts the speed of revolution of the governor lever and controls the speed of the rack 45.

The governor lever is contacted to a resistance body, which reduces the operating speed of the governor lever to the starting fuel amount position.

Figure 20:
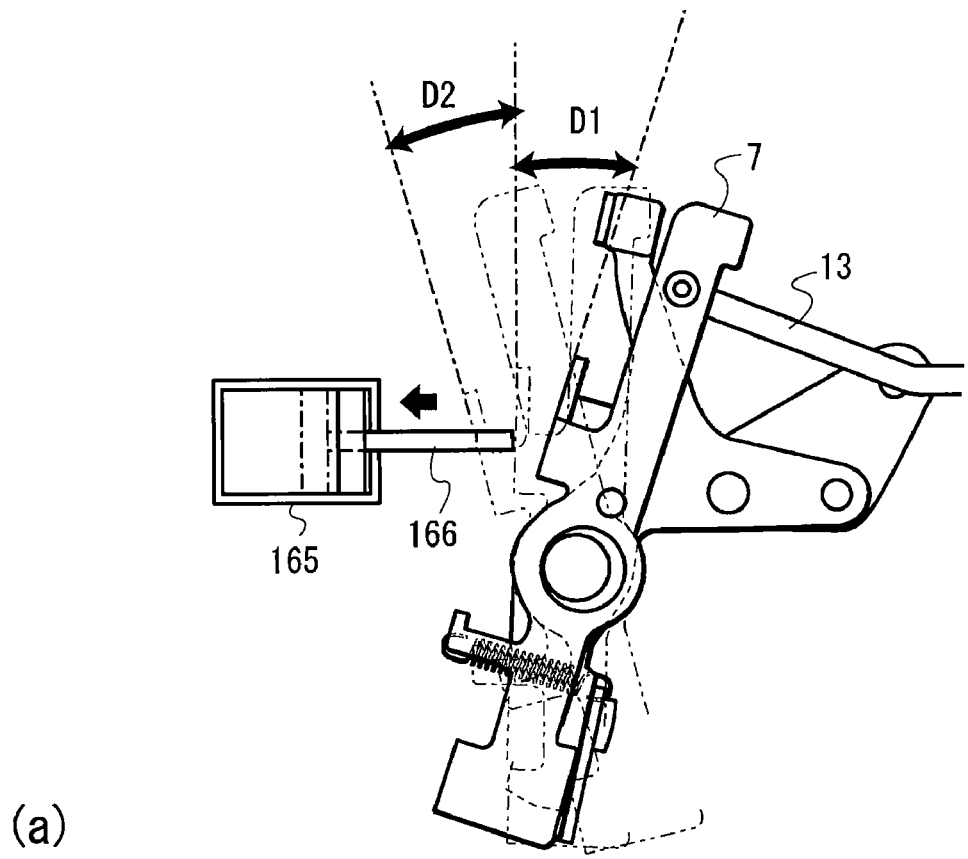
FIG. 20 is a view illustrating an operation of the governor lever and the rack in the sixth embodiment.
Figure 20:
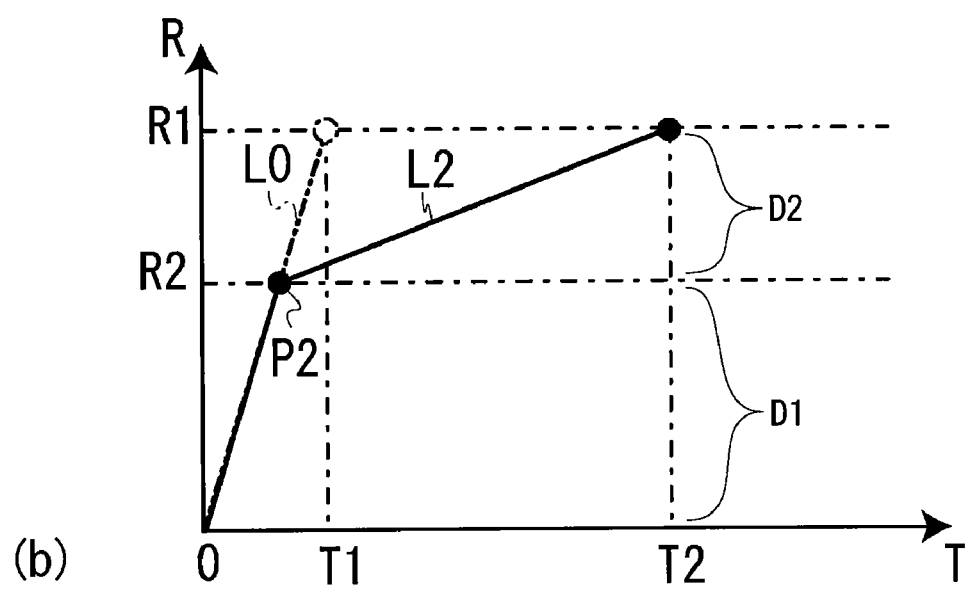

FIG. 20 illustrates an operation of the governor lever and the rack in a sixth embodiment. FIG. 20(a) illustrates a relation between the governor lever and the damper. FIG. 20(b) illustrates a relation between the rack position and the elapsed time.

In this embodiment, the damper 165 controls the operating speed of the rack 45 after the stop solenoid 161 is released. The damper 165 is the resistance body to the governor lever 7.

The damper 165 is comprised at the rear portion of the casing of the fuel injection pump; a rod 166 is projected forward from the damper 165. As shown in FIG. 20(a), until the stop solenoid 161 is released, there is a distance between the tip of the rod 166 and the governor lever 7 as a revolution angle of the governor lever 7 (D1). Thus, after the stop solenoid 161 is released, the governor lever 7 is revolved by the angle D1 without contacting to the damper 165.

The governor lever 7 is contacted to the tip of the rod 166 and after, the governor lever 7 is revolved receiving the resistance from the damper 165, and the limiter 15 stops that revolution. The speed of revolution of the governor lever 7 is reduced by the resistance from the damper 165 while angles range D2.

In FIG. 20(b), the area until the point P2 that has not received the resistance from the damper 165 corresponds to the angle range D1, and the area that has received the resistance from the damper 165 corresponds to the angle range D2. That is, a member operating the rack 45 is contacted to a resistance body that gives resistance according to the operation toward the fuel increased side, and the operating speed of the rack 45 is reduced. As a result, surplus fuel supply to the engine can be avoided, and saving a fuel and suppressing black smoke in starting the engine can be achieved. The characteristic of the damper 165 can be easily adjusted by means of the shape of orifice or others. A connecting member with a rod of the stop solenoid 161 is provided, so that the projection of the rod of the stop solenoid 161 can make the rod 166 of the damper 165 projected.

Seventh Embodiment

The composition that can change the contacting position between the damper and the governor lever 7 is described below, in a seventh embodiment.

Figure 21:
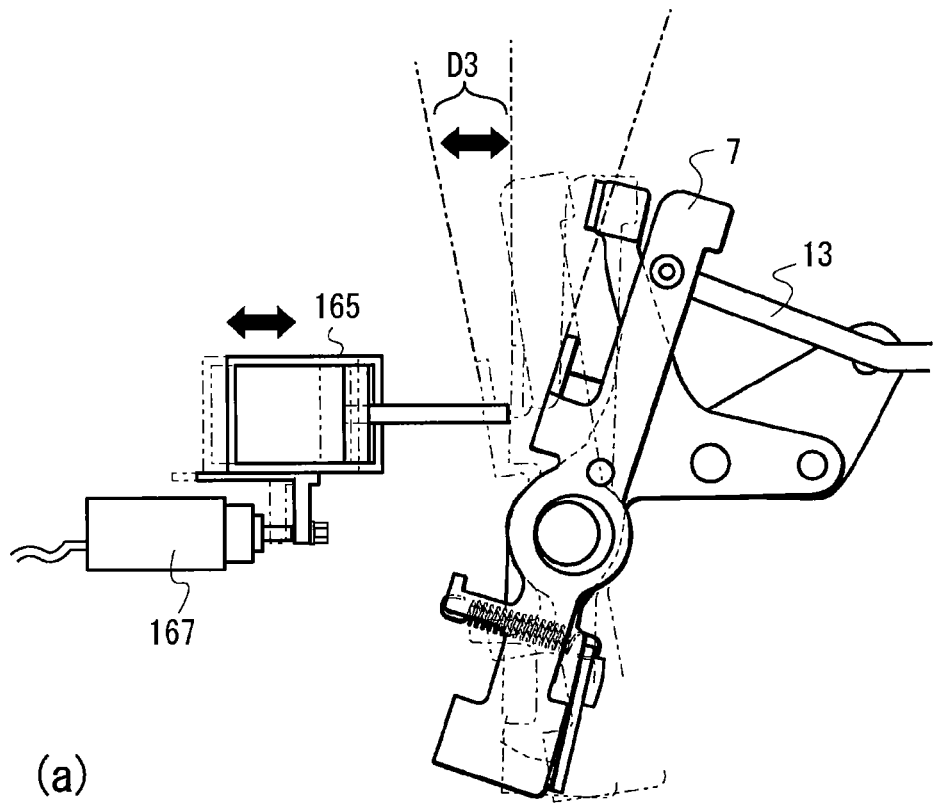
FIG. 21 is a view illustrating a composition in the seventh embodiment.
Figure 21:
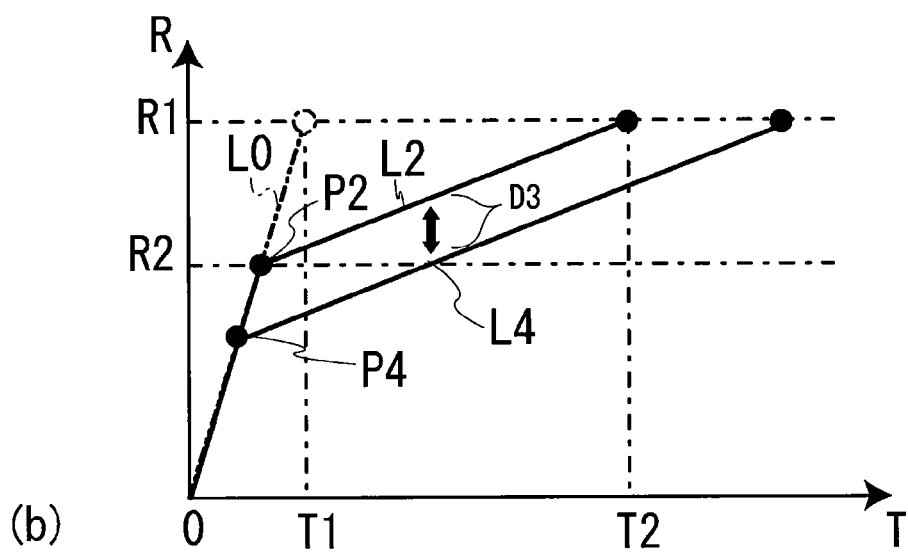

FIG. 21 illustrates a composition in a seventh embodiment. FIG. 21(a) illustrates a composition of the connection between the damper and the actuator. FIG. 21(b) illustrates a relation between the rack position and the elapsed time in this embodiment.

A casing of the damper 165 is connected to a rod of an actuator 167, and the actuator 167 can adjust the position of the damper 165. Thus, the timing that the damper 165 contacts to the governor lever 7 can be changed. As shown in FIG. 21(b), the position of the damper 165 is adjusted in a range D3 in FIG. 21(a), and then the timing that the operating speed of the rack 45 becomes gradual can be adjusted. The position of the damper 165 operated by the actuator 167 is capable of adjusting according to the above-mentioned CSD 50, the temperature of the cooling water, the temperature of lubricant, or the temperature of fuel. The method as shown in FIG. 11(a) is available as the method to adjust the position.

As a result, it is possible to control the fuel smoothly and quickly by means of controlling the amount of fuel supply in starting the engine according to the environment around the engine, and saving a fuel and suppressing black smoke is achieved.

Eighth Embodiment

An eighth embodiment of the invention is as shown in the presentation below.

Figure 22:
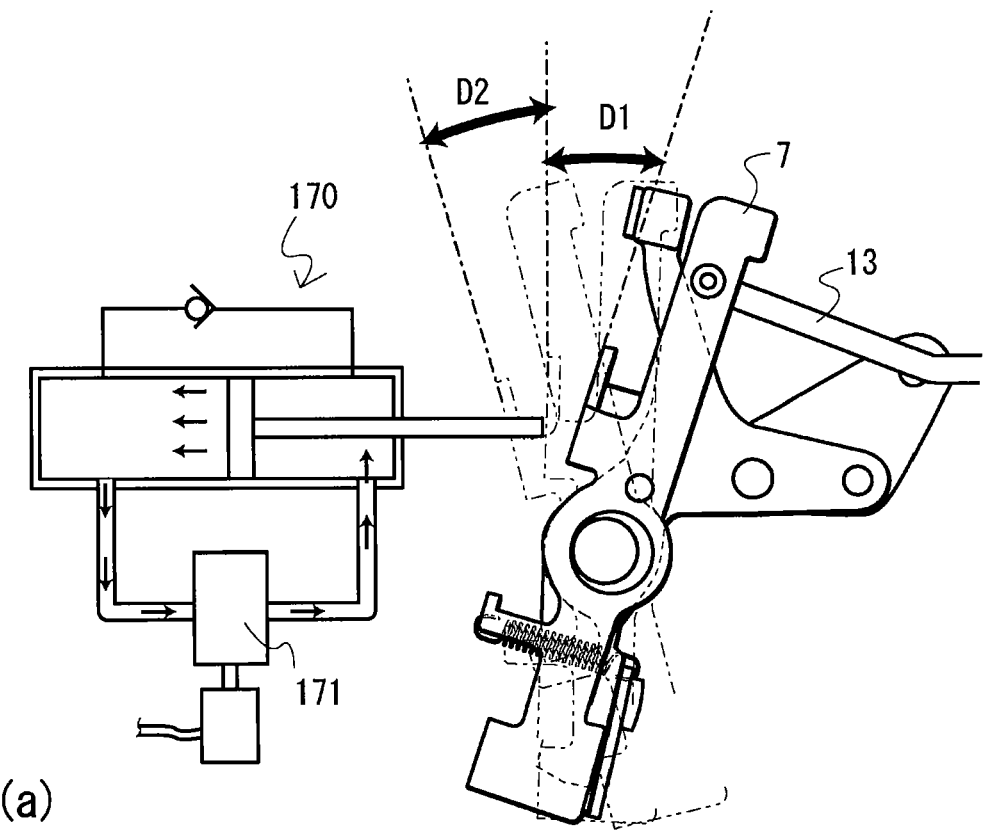
FIG. 22 is a view illustrating a composition in the eighth embodiment.

In this embodiment, the resistance force of the damper is controllable, that is, the operating speed of the rack 45 is controlled by controlling the speed of revolution of the governor lever 7 according to the load condition or the temperature of the engine. FIG. 22 illustrates a composition in eighth embodiment. FIG. 22(*a*) illustrates a composition of the resistance force of the damper is controllable. FIG. 22(*b*) illustrates a relation between the rack position and the elapsed time.

A damper 170 comprises a piston in the closed cylinder, and a rod that contacts to the governor lever 7 is connected to the piston. The cylinder is filled with hydraulic fluid, and the front portion of the cylinder is connected with the rear portion of the cylinder through a variable valve 171. By adjusting the variable valve 171, it is possible to control the resistance that is from outflow and inflow of hydraulic fluid by the movement of the piston.

That is, as shown in FIG. 22(*b*), the governor lever 7 is contacted to the damper 170, and the variable valve is operated, so that the resistance of hydraulic fluid in the cylinder is controlled and the operating speed of the rack 45 can be controlled. The variable valve 171 is connected to the controller 31, and it is possible to supply fuel according to the environment around the engine by means of adjusting the variable valve 171 according to the ignition of the engine or the connection of the work machine.

Ninth Embodiment

The composition that can change the contacting position between the damper and the governor lever 7, using a temperature-sensitive element, is described below, in a ninth embodiment.

Figure 23:
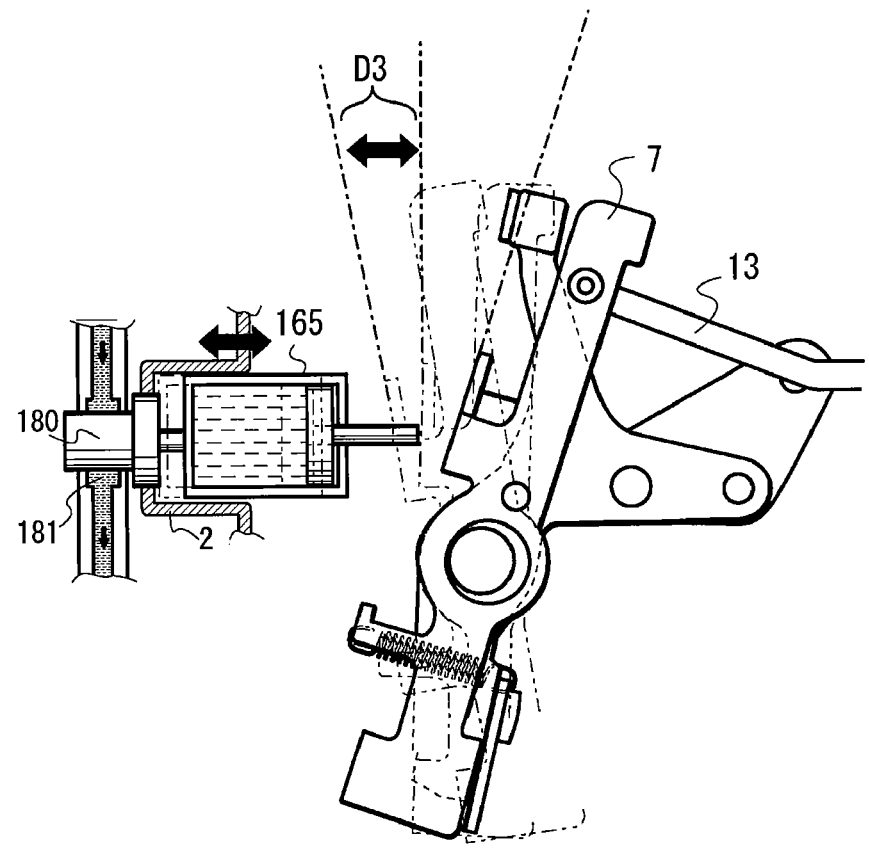
FIG. 23 is a view illustrating a composition in the ninth embodiment.
Figure 23:
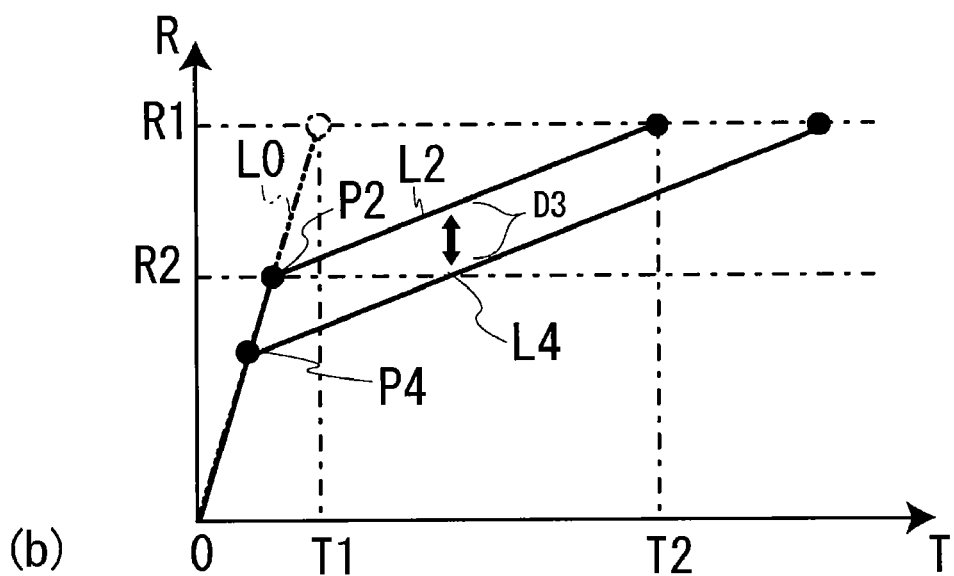
Figure 24:
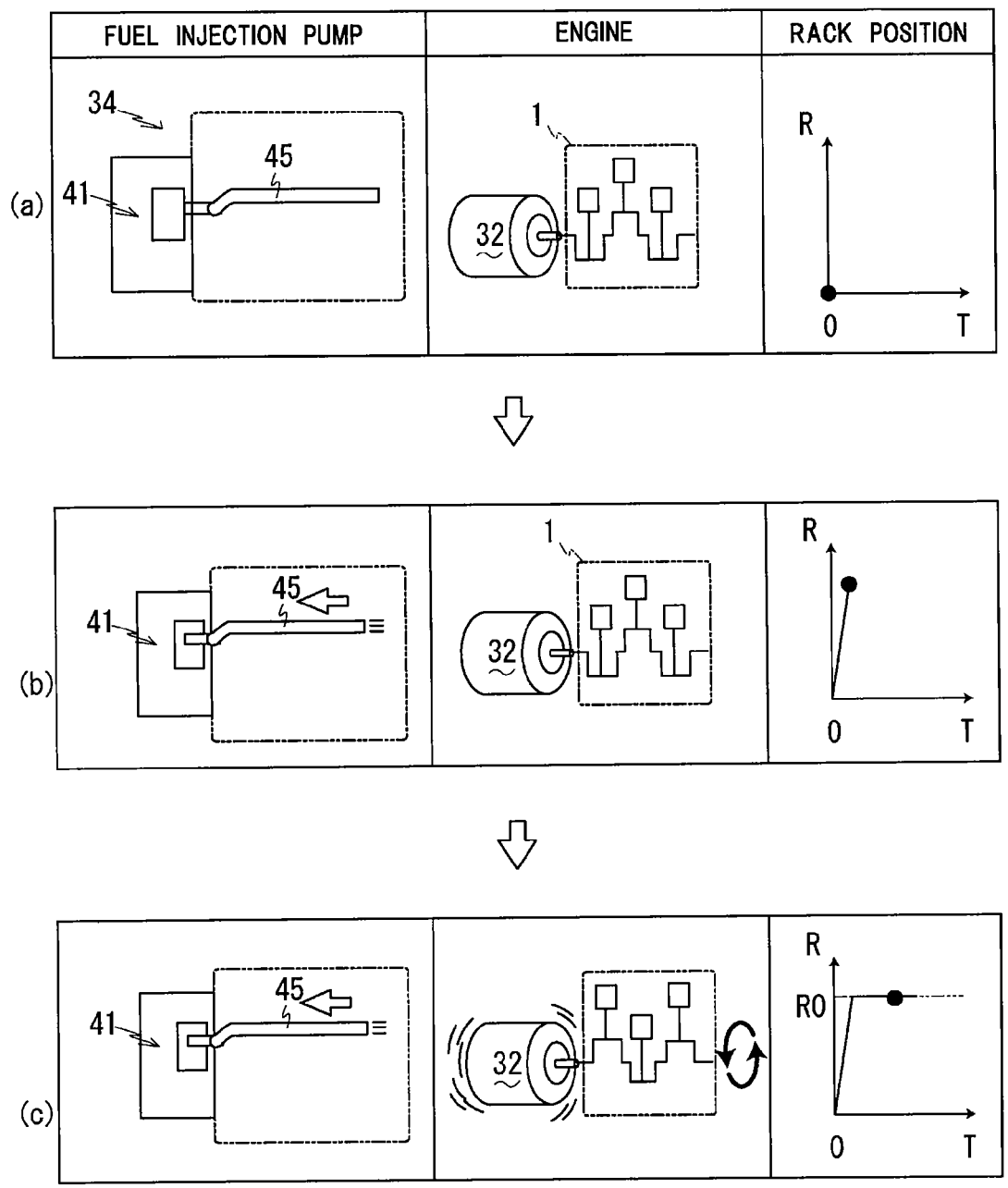
FIG. 24 is a schematic illustration illustrating the conventional operation in starting the engine.

FIG. 23 illustrates a composition in ninth embodiment. FIG. 23(*a*) illustrates a composition of the connection among the temperature-sensitive element, the damper, and the actuator. FIG. 23(*b*) illustrates a relation between the rack position and the elapsed time in this embodiment.

The casing of the damper 165 is connected to a tip of the temperature-sensitive element 180. The temperature-sensitive element 180 is equipped with the casing 2, and when the temperature-sensitive element is warmed, the tip is projected toward the governor lever 7. When the temperature-sensitive element is cooled, the tip is returned away from the governor lever 7.

The temperature-sensitive element 180 is provided in a fuel chamber 181 comprised in a fuel passage, so that the temperature of fuel is transferred. Thus, the position of the damper 165 is controlled according to the temperature of fuel. If the temperature of fuel is low, the timing of contacting to the governor lever 7 is delayed, and the initial fuel supply is increased. That is, a point P4 is changed to the point P2 in FIG. 22(*b*). As a result, it is available to smoothly start the engine by increasing the fuel under the low temperature condition. It is possible to control the fuel smoothly and quickly by means of controlling the amount of fuel supply in starting the engine according to the environment around the engine, and saving a fuel and suppressing black smoke is achieved. The wax used in the CSD 50 is applicable as the temperature-sensitive element.

INDUSTRIAL APPLICABILITY

According to the invention of the present application, the fuel injection device can be suitably applicable to a control mechanism of an amount of fuel.

What is claimed is:

1. A fuel injection device of a diesel engine comprising:
a fuel amount control means including a rack which is operable between a lowest rack position for injecting a minimum fuel amount and a starting increased fuel amount position for increasing an injected fuel amount when starting the engine,
wherein an operation of the rack of the fuel amount increasing means from the lowest rack position to the starting increased fuel amount position includes an operating speed range in which the operating speed of the rack is slower than a maximum operating speed of the rack.

2. The fuel injection device of the diesel engine according to claim 1, wherein a plurality of target rack positions are set one after another by steps to correspond to respective elapsed times since starting of said operation of the rack so as to change a position of the rack according to an elapse of time since starting of said operation of the rack.

3. The fuel injection device of the diesel engine according to claim 1, further comprising an ignition recognizing means for recognizing an ignition of the engine in starting the engine, wherein during said operation of the rack of the fuel amount control means from the lowest rack position to the starting increased fuel amount position, movement of the rack per unit time is reduced after the ignition recognizing means recognizes the ignition of the engine.

4. The fuel injection device of the diesel engine according to claim 1, wherein the rack is operated to the starting increased fuel amount position at the maximum operating speed thereof after an elapse a predetermined time.

5. The fuel injection device of the diesel engine according to claim 1, wherein the operating speed of the rack is changed according to a temperature of the engine when starting the engine.

6. The fuel injection device of the diesel engine according to claim 1, wherein the operation of the rack of the fuel amount control means from the lowest rack position to the starting increased fuel amount position is performed during cranking of the engine with a starter.

7. The fuel injection device of the diesel engine according to claim 1, wherein the operation of the rack of the fuel amount control means from the lowest rack position to the starting increased fuel amount position is two-stepped with respect to the operating speed so that the operating speed of the rack after reaching an intermediate rack target position is slower than the operating speed of the rack until reaching the target intermediate rack position.

8. The fuel injection device of the diesel engine according to claim 7, wherein a set intermediate rack target position is changed according to a temperature of the engine when starting the engine.

* * * * *